United States Patent
Jung et al.

(10) Patent No.: US 7,884,161 B2
(45) Date of Patent: *Feb. 8, 2011

(54) METHOD FOR PREPARATION OF 1-ALKENE-ACRYLATE BASED COPOLYMER

(75) Inventors: Yoo-young Jung, Gyeonggi-do (KR); Byoung-ho Jeon, Daejeon (KR); Bae-kun Shin, Incheon (KR); Ki-soo Lee, Daejeon (KR); Yong-gyu Han, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/225,174

(22) PCT Filed: Mar. 13, 2007

(86) PCT No.: PCT/KR2007/001212

§ 371 (c)(1), (2), (4) Date: Sep. 2, 2009

(87) PCT Pub. No.: WO2007/105898

PCT Pub. Date: Sep. 20, 2007

(65) Prior Publication Data

US 2010/0113723 A1    May 6, 2010

(30) Foreign Application Priority Data

Mar. 13, 2006  (KR) .............. 10-2006-0023084
May 30, 2006   (KR) .............. 10-2006-0048643
Sep. 25, 2006  (KR) .............. 10-2006-0092790

(51) Int. Cl.
  *C08F 4/08*    (2006.01)
  *C08F 4/14*    (2006.01)
  *C08F 220/10*  (2006.01)

(52) U.S. Cl. ............... 526/100; 526/135; 526/147; 526/192; 526/195; 526/219.2; 526/221; 526/226; 526/227; 526/238; 526/281; 526/282; 526/309; 526/329

(58) Field of Classification Search ............. 526/100, 526/135, 147, 219.2, 221, 226, 192, 195, 526/227, 238, 281, 282, 329
See application file for complete search history.

(56) References Cited

U.S. PATENT DOCUMENTS

| | | | |
|---|---|---|---|
| 2,728,754 A * | 12/1955 | Evering et al. ............. 526/69 |
| 2,818,407 A * | 12/1957 | Aldrich .................. 526/100 |
| 2,953,551 A | 9/1960 | White |
| 3,350,372 A | 10/1967 | Anspon et al. |
| 3,496,217 A | 2/1970 | Drinkard, Jr. et al. |
| 3,496,218 A | 2/1970 | Drinkard |
| 3,496,271 A | 2/1970 | Drinkard, Jr. |
| 3,596,218 A | 7/1971 | Layton |
| 3,773,808 A | 11/1973 | Wesselman |
| 3,773,809 A | 11/1973 | Walter |
| 3,956,248 A * | 5/1976 | Logothetis ............. 526/219.2 |
| 3,959,225 A * | 5/1976 | Kuntz ..................... 526/73 |
| 4,001,159 A * | 1/1977 | Imai et al. ............... 524/161 |
| 4,774,353 A | 9/1988 | Hall et al. |
| 4,874,884 A | 10/1989 | McKinney et al. |
| 5,041,664 A | 8/1991 | Su |
| 5,210,166 A | 5/1993 | Ziegler et al. |
| 5,376,739 A | 12/1994 | Pfleger et al. |
| 5,543,477 A | 8/1996 | Latiolais et al. |
| 6,127,567 A | 10/2000 | Garner et al. |
| 6,171,996 B1 | 1/2001 | Garner et al. |
| 6,380,421 B1 | 4/2002 | Lu et al. |
| 7,091,293 B2 * | 8/2006 | Kuwahara et al. ......... 526/238 |
| 7,629,423 B2 * | 12/2009 | Jung et al. .............. 526/100 |
| 2003/0060577 A1 | 3/2003 | Benicewicz et al. |
| 2005/0020775 A1 | 1/2005 | Wu et al. |
| 2005/0277569 A1 | 12/2005 | Goodall et al. |
| 2006/0100403 A1 | 5/2006 | Yoon et al. |

FOREIGN PATENT DOCUMENTS

| | | |
|---|---|---|
| CN | 1693329 A | 11/2005 |
| EP | 0 282 972 A2 | 9/1988 |
| JP | 2-308803 A | 12/1990 |
| JP | 2004277473 A | 10/2004 |

* cited by examiner

*Primary Examiner*—Fred M Teskin
(74) *Attorney, Agent, or Firm*—Lerner, David, Littenberg, Krumholz & Mentlik, LLP

(57) ABSTRACT

The present invention provides a method for preparation of an 1-alkene-acrylate based copolymer comprising a step of a radical polymerization reaction of 1-alkene and acrylate based monomer under presence of a metal oxide or Lewis acid, and a method for preparation of an alkene-acrylate based copolymer comprising reacting alkene with an acrylate based monomer under presence of a metal oxide. In the method of preparation according to the present invention, the process is simple and properties of the copolymer can be easily controlled by preparing the copolymer in a mild condition of 100° C. or less and 200 bar or less. In addition, the amount of the polar group of the copolymer prepared by the method is so high that the copolymer can be used for transparent optical products. Since the alkene-acrylate based copolymer prepared by the method is a random copolymer of ethylene and a polar monomer and the amount of the polar group of the polar monomer so high that the crystallinity of the ethylene monomer does not remain in the copolymer, the ethylene-acrylate based copolymer is not affected from a transparency of the polymer and thus may be used for optical products.

28 Claims, 6 Drawing Sheets

[Fig. 1]
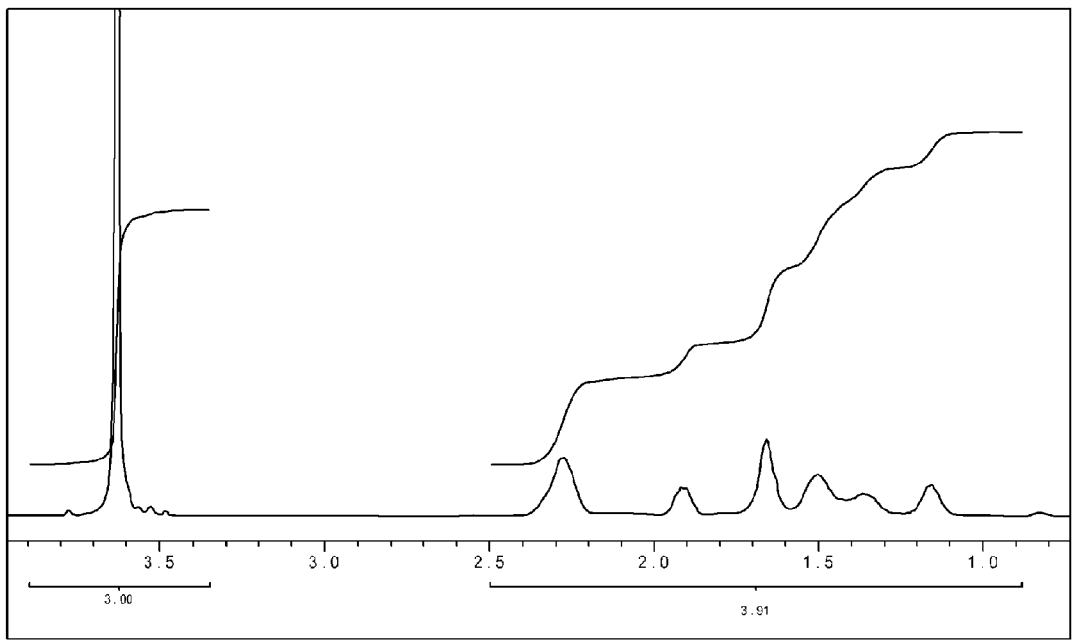
[Fig. 2]
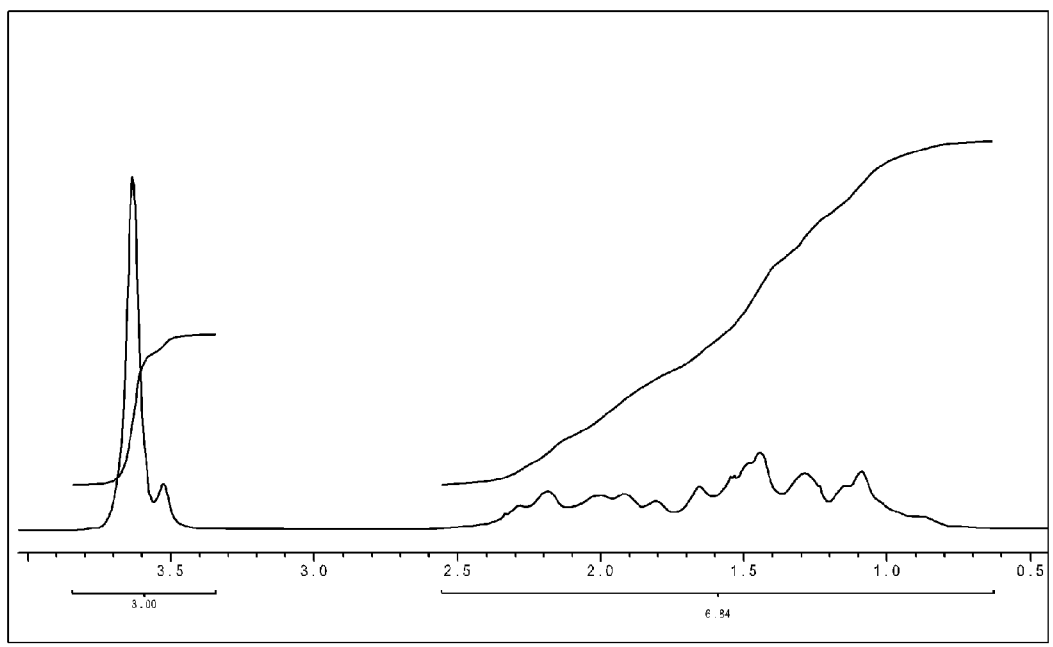

[Fig. 3]
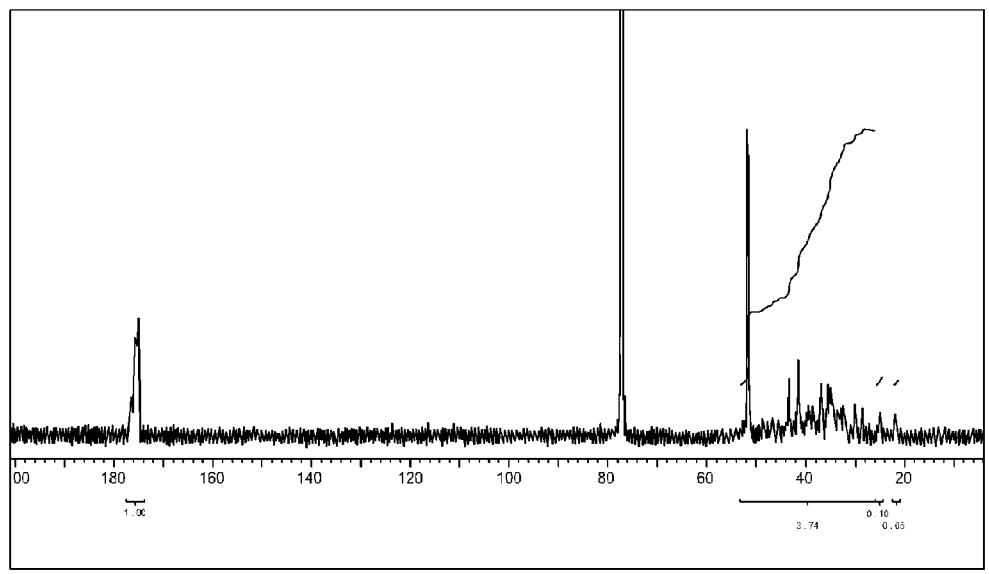
[Fig. 4]
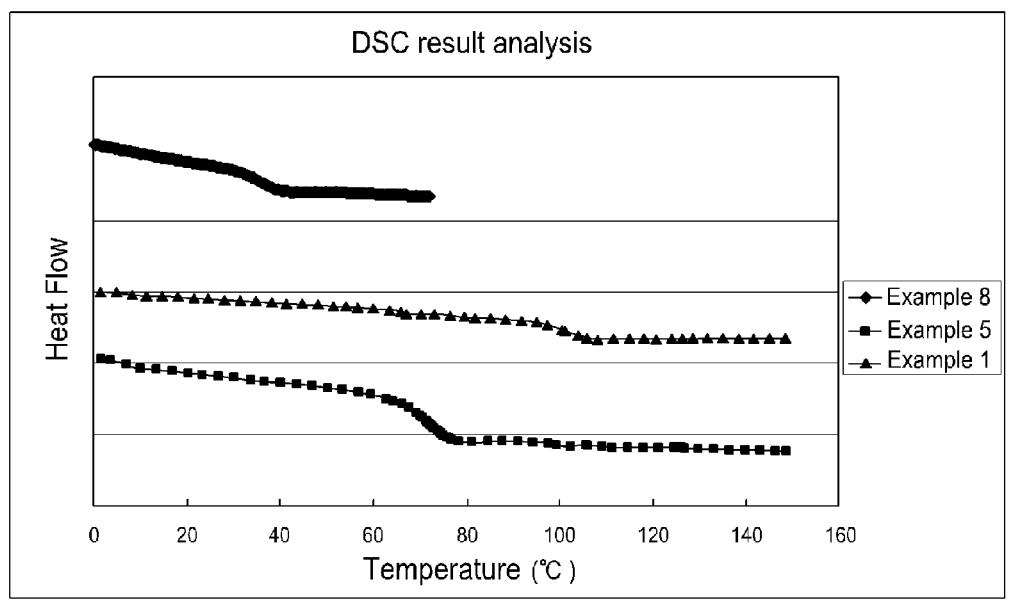

[Fig. 5]
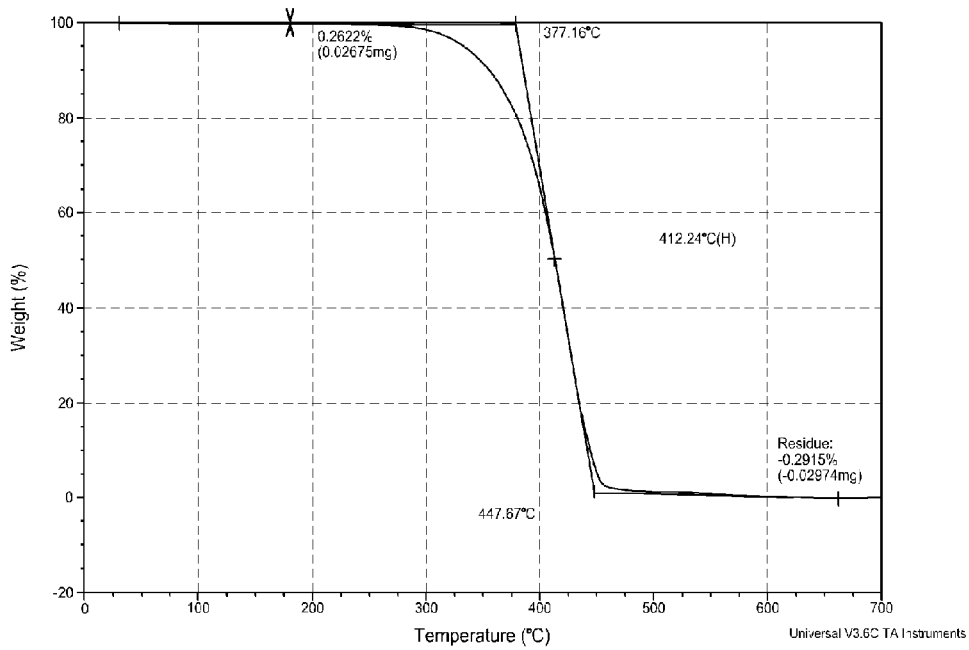
[Fig. 6]
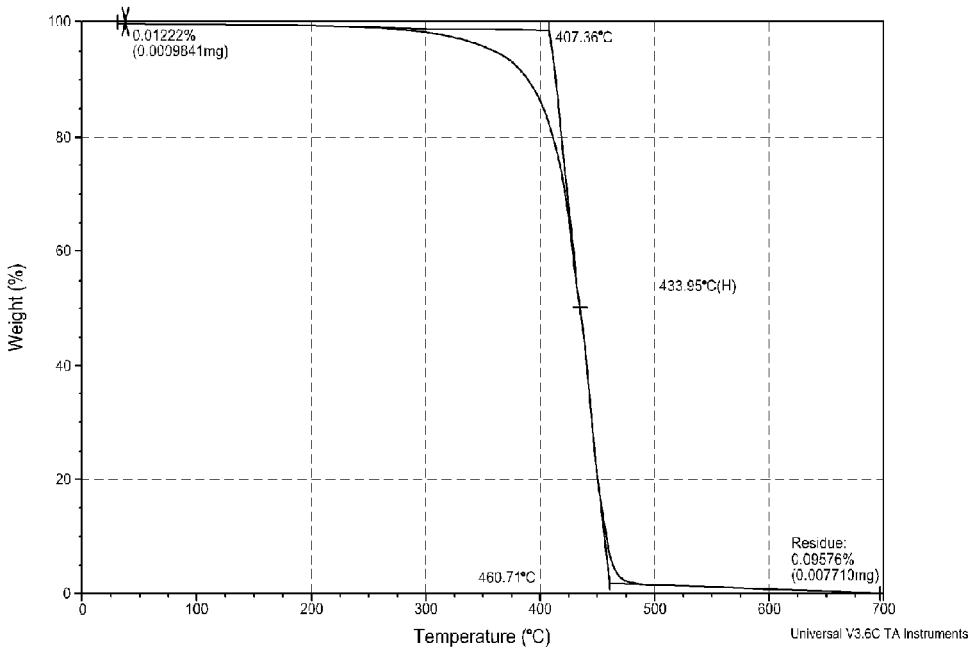

[Fig. 7]
GPC Distribution Plot
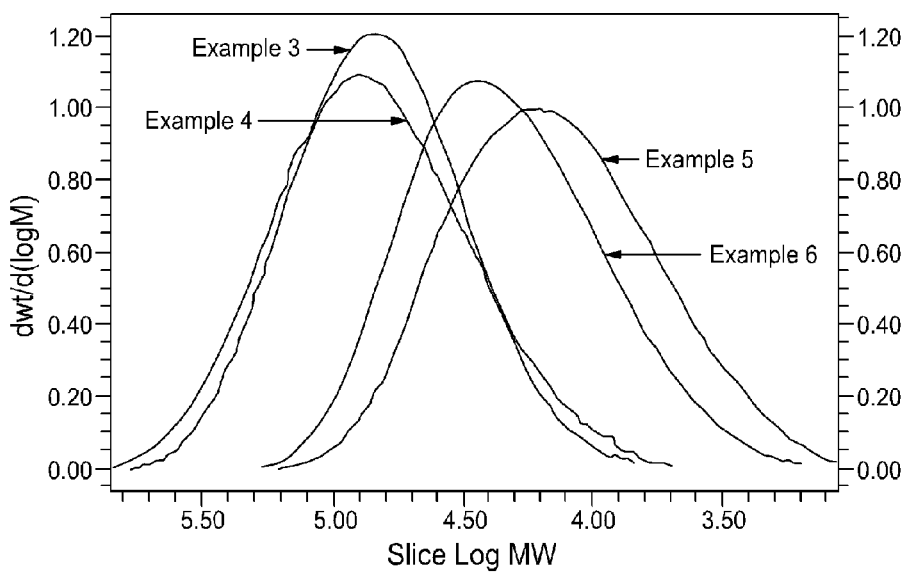
[Fig. 8]
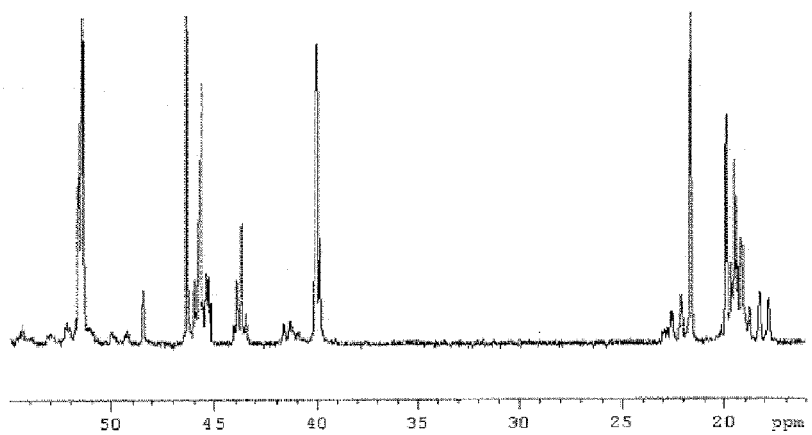
[Fig. 9]
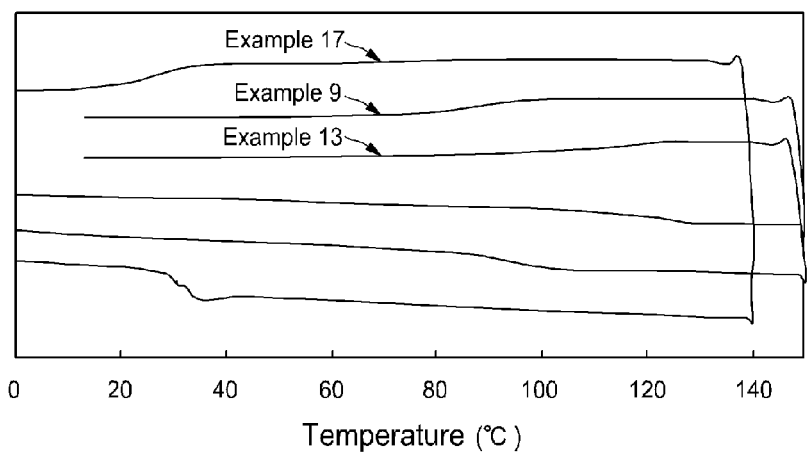

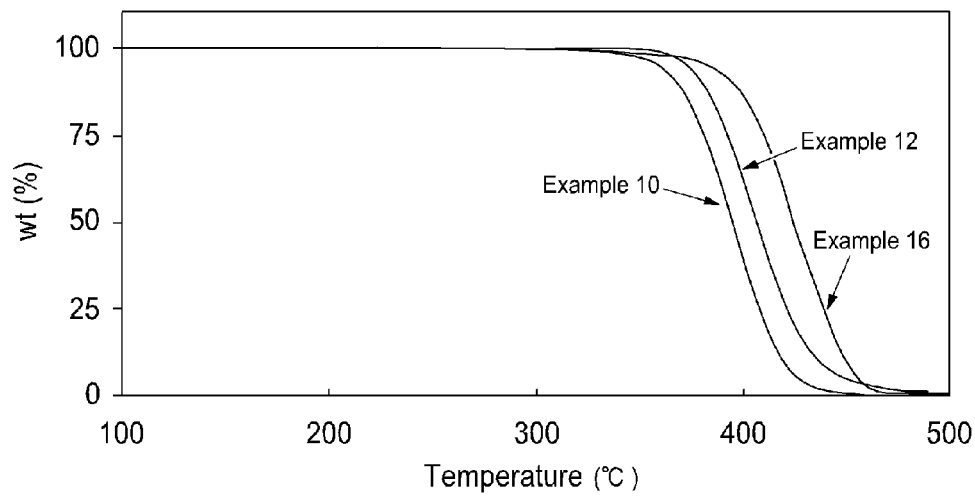
[Fig. 10]
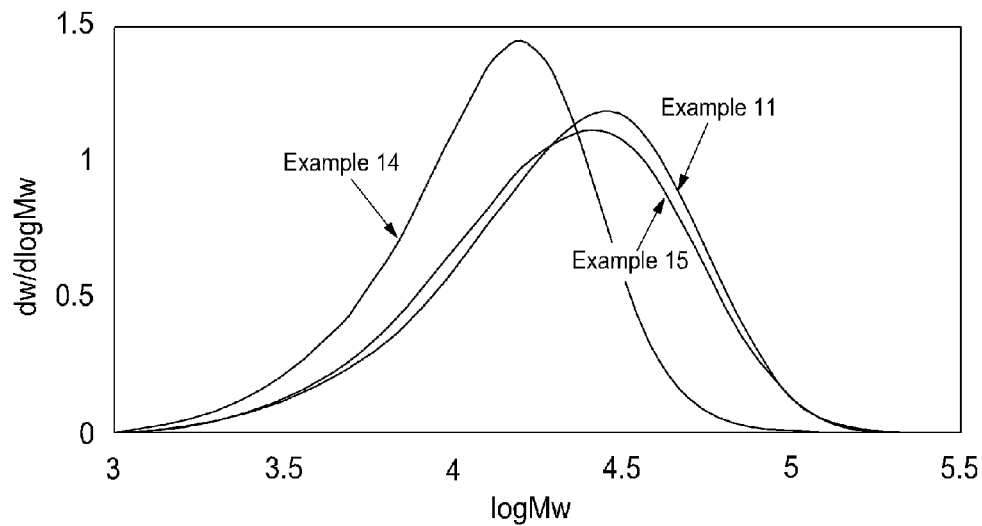
[Fig. 11]

[Fig. 12]
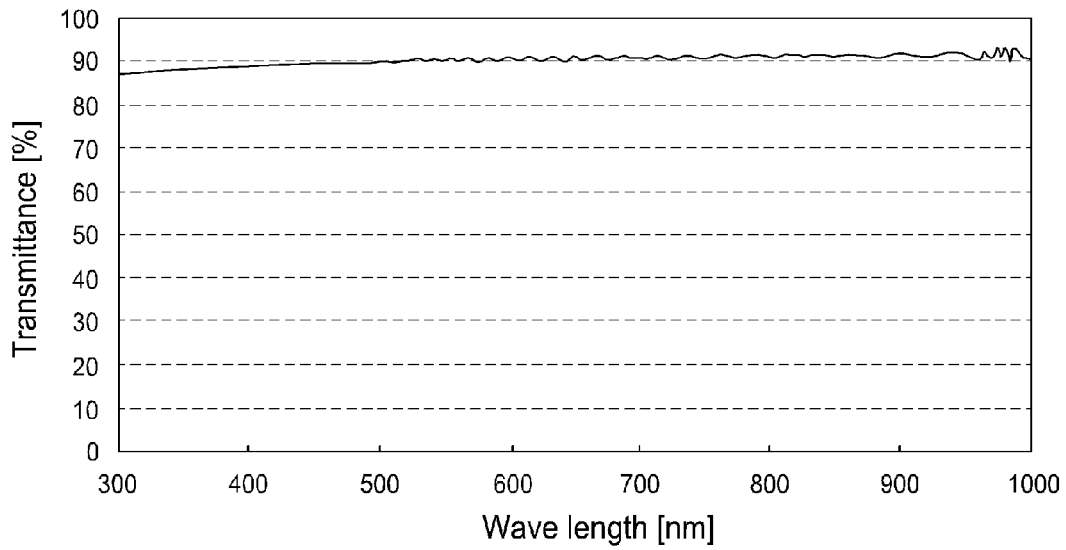
[Fig. 13]
Contact angle measurement
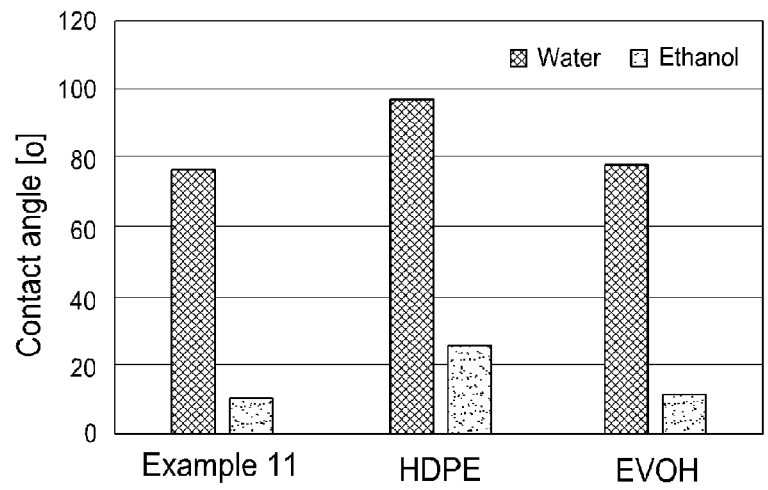

METHOD FOR PREPARATION OF 1-ALKENE-ACRYLATE BASED COPOLYMER

TECHNICAL FIELD

The present invention relates to a method for preparation of an 1-alkene-acrylate based copolymer.

BACKGROUND ART

When 1-alkene, particularly, ethylene and a monomer, such as alkyl(meth)acrylate, alkyl methacrylate ester or vinyl ester are copolymerized, a copolymer having different properties in comparison with that of a simple polyethylene may be formed. For example, an adhesive force and a low temperature toughness may be significantly improved as an amount of the monomer(s) increases. Accordingly, researches on copolymers formed from such 1-alkenes and other monomers have been actively conducted.

According to a conventional technique, a copolymer of ethylene or alkyl acrylate or a copolymer of ethylene and alkyl methacrylate is obtained by increasing an amount of a monomer under a condition of high temperature and high pressure. As a result, a tube-type reactor or an autoclave reactor which endures high temperature and high pressure has been used. For example, U.S. Pat. Nos. 2,953,551, 3,350,372, and 5,543,477 disclose that a reaction is progressed by adding concurrently ethylene and acryl based monomer in harsh a condition, such as at a pressure of 1000 bar or more and at a temperature of 100° C. or more, using an autoclave apparatus or a tube-type reactor. A polymer obtained from this reaction is a copolymer including 3~35% of the acrylate based monomer that is a polar monomer based on the weight of ethylene.

In order to realize such condition of high temperature and high pressure, however, additional devices, such as a first compressor, a second compressor and a special reactor are required for safety of users. In addition, due to such harsh condition, to adjust the compositions in the copolymers to a desired direction, it is largely with many limitation requirements. That is, in a conventional method of preparing an ethylene based copolymer, even a capacity of a compressor used in the process and a post process after the reaction should be considered to control a melting temperature of the copolymer in the range of 50~100° C.

In addition, the ethylene based copolymer prepared according to the conventional method includes only a small amount of a polar group. That is, the amount of a polar monomer is so small that polyethylene crystals remain in the copolymer, which is not desired for optical products, such as a transparent film. Although in ethylene vinyl acetate and ethylene methyl acrylate which are the conventional products, a melting temperature decrease as an amount of the ethylene monomer increases, and is not sufficient to develop amorphous resins in the conventional method. Thus, the polymers produced using the conventional tube-type reactor or autoclave at high temperature and high pressure are applicable only to products which are not largely affected from the opacity of the polymers.

Accordingly, there is a need to develop a new method of preparing a copolymer which is amorphous due to presence of a large amount of a monomer having a polar functional group therein, while avoiding the condition of high temperature and high pressure.

On the other hand, a method of preparing copolymer of olefin and vinyl monomer using a metallic complex compound catalyst has been known. Due to high affinity of a metal to oxygen, however, the method has a disadvantage that the metallic complex compound catalyst based on transition metal and lathanide based metal in the first development stage is easily contaminated by a functional group (C=O) of a polar vinyl monomer. Although it has been reported that the copolymer of alkyl acrylate and olefin may be prepared using a metallic complex compound catalyst based on some of transition metal in the later development stage, the copolymer still has the large amount of olefin.

On the other hand, in order to overcome the disadvantage of the polymerization method by the metallic complex compound catalyst, that the metallic complex compound catalyst is contaminated by oxygen existing in a polar group and an activity of the metallic complex compound catalyst thus decreases and that a polymer having a small amount of a polar group contained therein are obtained, a controlled radical polymerization has been proposed. When the copolymer of olefin and polar vinyl monomer is produced by ATRP (Atom Transfer Radical Polymerization) method, which is a representative polymerization method among the controlled radical polymerization methods, an amount of the polar vinyl monomer is larger than that of olefin, contrary to the polymerization method by the metallic complex compound catalyst. That is, a random copolymer in which an amount of olefin is controlled in some degrees according to conditions of copolymerization may be produced. However, when the copolymer is produced by ATRP method, it takes long time to obtain high molecular weight and the copolymer having the so small amount of olefin is obtained. In addition, the 1-alkene-alkyl(meth)acrylate copolymer produced by the ATRP method has the small amount of ethylene in the polymer chain so that the copolymer can be easily broken and thus film properties decrease.

Since 1-alkene-acrylate based copolymer has high transparence, the polymer may be used in optical products. To do this, a thermal resistance should be excellent so that there is no deformation occurred by heat created when process of preparation and optical instruments are operating. Accordingly, there is a need to develop a copolymer which can improve properties such as the thermal resistance.

On the other hand, JP publication 2-308803 (date of the public: Dec. 21, 1990) discloses a method of preparing a copolymer of ethylene-unsaturated carbonic acid in which a copolymer of ethylene-unsaturated carbonic acid ester is obtained by a polymerization of ethylene and unsaturated carbonic acid ester under presence of Lewis acid using a catalyst consisting mainly of a chronic compound and an organometallic compound and the resultant copolymer of ethylene-unsaturated carbonic acid ester is then placed in a heat process of 80~150° C. Wherein an amount of the unsaturated carbonic acid ester used in preparing the copolymer of ethylene-unsaturated carbonic acid ester is 0.001~45 mol %.

DISCLOSURE OF INVENTION

Technical Problem

A first technical task of the present invention for solving the problems of the conventional technique is to provide an amorphous 1-alkene-acrylate based copolymer including a large amount of the monomer having the polar functional group, particularly an ethylene-acrylate copolymer.

A second technical task of the present invention is to provide a method of preparing the 1-alkene-acrylate based copolymer in a mild condition.

A third technical task of the present invention is to provide a method of preparing an alkene-acrylate based copolymer obtained by a radical polymerization under presence of a metal oxide in a mild condition.

A fourth technical task of the present invention is to provide an optical film including the copolymer.

Technical Solution

The present invention, in order to achieve the first technical task, provides an amorphous 1-alkene-acrylate based copolymer including a large amount of the monomer having the polar functional group.

The present invention, in order to achieve the second technical task, provides a method of preparing the 1-alkene-acrylate based copolymer under presence of a metal oxide or Lewis acid.

The present invention, in order to achieve the third technical task, provides a method of preparing an alkene-acrylate based copolymer under a metal oxide.

The present invention, in order to achieve the fourth technical task, provides an optical film including the copolymer.

The present invention will now be described in more detail.

An 1-alkene-acrylate based copolymer represented in the present specification refers to a copolymer formed by a polymerization of an 1-alkene monomer and an acrylate monomer, and it will be easily understood by those of ordinary skill in the art that double bonds of the monomers do not remain in main the chain of the copolymer.

The present invention provides an 1-alkene-acrylate based copolymer formed by a polymerization of 1-alkene and an acrylate based monomer.

The 1-alkene monomer used for preparing the 1-alkene-acrylate based copolymer is 1-alkene having a double bond in a terminal of a carbon chain. As defined by IUPAC nomenclature, 1-alkene means a hydrocarbon compound having a double bond of carbon-carbon in C1 that is in a terminal of a carbon chain, and it is distinguished from 2-butene, 2-pentene, 2-hexene, 3-hexene, 2-heptene, 2-octene and 2-nonene, etc., having the double bond in the middle of the carbon chain, and also distinguished from a cyclic compound having the double bond of carbon-carbon included inside a cyclic structure of the cyclic compound, such as norbornene or norbornene derivatives. The 1-alkene can be an aliphatic hydrocarbon compound, for example, ethylene, propylene, 1-butene, 1-pentene, 1-hexene, 1-heptene, 1-octene, 1-nonene and 1-decene, etc.

In the present invention, ethylene may particularly be used as the 1-alkene monomer and a mixture of 1-alkenes may also be used.

An amount of the 1-alkene monomer contained in the copolymer of the present invention is 1~70 mol %, preferably 1~65 mol % or 1~60 mol %, more preferably 1~50 mol % or 5~50 mol %, and further preferably 10~50 mol %. A copolymer formed by only polar group monomer without the alkene monomer can be easily broken. Particularly when the amount of the alkene monomer is less than about 10 mol %, the copolymer of the present invention can be easily broken in forming of film and thus is not suitable for a deposition film in optical products. However, it can be applied for products in other uses which are not largely affected by such problem.

The acrylate based monomer used for preparing the copolymer of the present invention may be all the compounds having a double bond between carbonyl group of ester group and conjugated carbons, that is, their substituents are not particularly limited. The acrylate based monomer may therefore include a monomer of acrylate derivatives, such as alkyl acrylate and alkyl methacrylate, as well as acrylate, and all acrylate based monomers used in the art can be used.

For example, the acrylate based monomer can be a compound as represented in Formula 1.

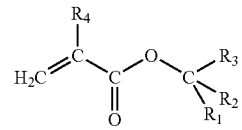

ChemistryFigure 1

In the Formula 1, $R_1$, $R_2$ and $R_3$ are hydrogen atom or C1-C30 (I) hydrocarbon group including or not including hetero atom, respectively and independently, and $R_4$ is hydrogen atom or C1-C6 alkyl group.

Preferably, $R_1$, $R_2$ and $R_3$ are hydrogen atom or a linear or branched C1-C12 alkyl group, respectively and independently, and $R_4$ is hydrogen atom or C1-C4 alkyl group.

Preferably, the acrylate based monomer is methyl acrylate or methyl methacrylate.

As another example, the acrylate based monomer can be alkyl acrylate including a linear or branched C1-C12 alkyl group, alkyl methacrylate including a linear or branched C1-C12 alkyl group, or alkyl butacrylate including a linear or branched C1-C12 alkyl group.

As another example, a compound or a mixture thereof as represented in Formulas 2 and 3 can be used as the acrylate based monomer.

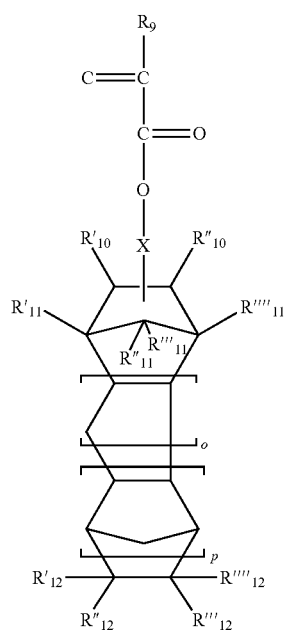

ChemistryFigure 2

-continued

ChemistryFigure 3

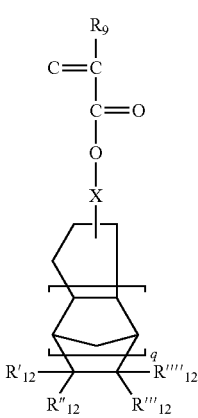

In the Formulas 2 and 3, o, p and q are a positive number of 0~2, respectively and independently, x is, in profile of acryloyl, a (II) connector referred as single bond, —(CH$_2$)$_r$—, —(C$_2$H$_4$O)$_r$—, —(C$_3$H$_6$O)$_r$—, or —(C$_4$—H$_8$)$_r$— (r is a positive number of 1~5), R$_9$ is hydrogen or methyl group, R'$_{10}$ and R"$_{10}$ are hydrogen, R'$_{11}$, R"$_{11}$R'''$_{11}$ and R''''$_{11}$ are hydrogen or methyl group (one among R'$_{10}$, R"$_{10}$, R'$_{11}$, R"$_{11}$, R'''$_{11}$ and R''''$_{11}$ is substituted with the x group), and R'$_{12}$, R"$_{12}$, R'''$_{12}$, R''''$_{12}$, R$_{13}$, R'$_{13}$ respectively, hydrogen; halogen; substituted or unsubstituted C1-C20 hydrocarbon group, bonding directly to a cyclic structure

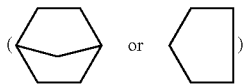

or bonding by a connector including oxygen, nitrogen sulfur or silicon; or polar group.

When the -x-group is single bond, —C(O)O— group of acrylate is directly bonded to

In R'$_{12}$, R"$_{12}$, R'''$_{12}$, R''''$_{12}$, R$_{13}$, and R'$_{13}$ of the Formulas 2 and 3, the halogen can be fluoride, chloride or bromide.

In R'$_{12}$, R"$_{12}$, R'''$_{12}$, R''''$_{12}$, R$_{13}$, and R'$_{13}$ of the Formulas 2 and 3, C1-C20 hydrocarbon group can be alkyl group such as methyl group, ethyl group, propyl group, isopropyl group, butyl group and isobutyl group; cycloalkyl group such as cyclopentyl group and cyclohexyl group; aryl group such as phenyl group, naphtyl group and antorasenyl group; alkalyl group such as methylphenyl group, ethylphenyl group and isopropyl phenyl group; and aralkyl group such as benzyl group and phenetyl group. Partial or whole hydrogen atoms in such hydrocarbon can be substituted, and the substituent can be halogen such as fluoride, chloride or bromide; cyano group; or phenylsulphonyl group.

In R'$_{12}$, R"$_{12}$, R'''$_{12}$, R''''$_{12}$, R$_{13}$, and R'$_{13}$ of the Formulas 2 and 3, the substituted or unsubstituted hydrocarbon group can be directly bonded to a cyclic structure

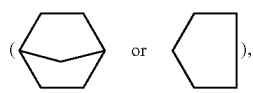

or bonded to a cyclic structure through a connector including oxygen, nitrogen, sulfur or silicon. The connector can be C(=O)—, —C(=O))O—, —OC(=O)—, —SO$_2$—, —O—, —S—, —NH—, —NHCO—, —CONH—, or —OSi(R)$_2$— (in the Formula, R is alkyl group such as methyl group and ethyl group), and the connector can also be a connector formed by the same kind or different kinds of connectors being bonded with each other.

In R'$_{12}$, R"$_{12}$, R'''$_{12}$, R''''$_{12}$, R$_{13}$, and R'$_{13}$ of the formulas 2 and 3, a polar group can be hydroxyl group, cyano group (—CN), amid group (—CONH), —NH$_2$, carboxylic group, or imide ring included group; trialkylsilyl group such as trimethylsilyl group and triethylsilyl group; or trialkoxysilyl group such as trimethoxysilyl group and triethoxysilyl group.

More specifically, acrylate monomers as represented in the Formulas 2 and 3 are

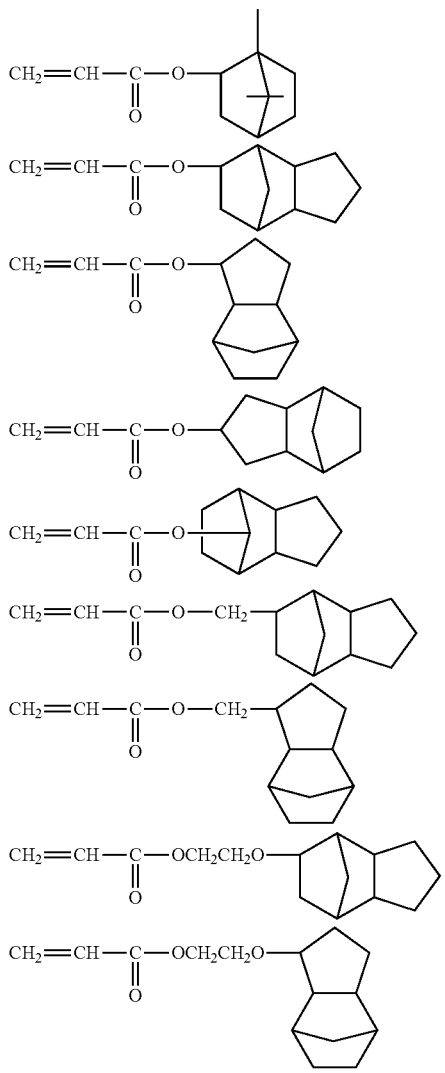

-continued

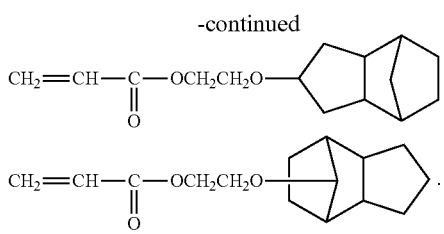

or a mixture thereof.

As another example, the acrylate based monomer can be one selected from the groups consisting of alkyl acrylate, alkyl methacrylate, alkyl butacrylate, alkyl acrylic acid, alkyl ester and mixtures thereof, wherein the alkyl group can be a linear or branched C1-C12 alkyl group.

As another example, the acrylate based monomer can be acrylic acid or methacrylic acid ester of a linear or branched C1-C12 alcohol, and preferably acrylic acid or methacrylic acid ester of a linear or branched C1-C8 alcohol.

As another example, the acrylate based monomer can be methyl acrylate, ethyl acrylate, n-butyl acrylate, iso-butyl acrylate, t-butyl acrylate, n-hexyl acrylate, 2-ethylbutyl acrylate or 2-ethylhexyl acrylate; and acrylic acid ester of a neo-isomer of C5-C12 alcohol, and preferably, an n-alkyl methacrylate.

The alkyl acrylate monomer or the alkyl methacrylate ester monomer can be used alone or in combination. In addition, monomers other than ethylene, alkyl acrylate or alkyl methacrylate ester can be included. Such additional monomers can be vinyl ester such as vinyl acetate; partial ester of acrylic acid, methacrylic acid or maleic acid; and a carbon monoxide, but not limited thereto and can include all of additional monomers used in the art.

An amount of such acrylate based monomer contained as a repetitive unit in the copolymer of the present invention is 30~99 mol %, preferably 35~99 mol % or 40~99 mol %, more preferably 50~99 mol % or 50~95% mol, and further preferably 50~90 mol %. In addition, the amount of such acrylate based monomer can be 45~55 mol %, and particularly the mole ratio of 1-alkene(A) to acrylate based monomer(B) can be 50 to 50 and alternative copolymer having -A-B-A-B- form.

As the amount of the acrylate based monomer that is a polar monomer increases, a crystallinity of 1-alkene such as ethylene, which is an unique feature of alkene can be prevented and thus an amorphous copolymer can be prepared. However, a conventional technique is not suitable to prepare such an amorphous copolymer. The amorphous copolymer can be used for optical products since it has high transparency and adhesiveness. In addition, the amorphous copolymer can be used for an electrical device since it has high adhesiveness to metal due to a great amount of the polar functional group.

In the reaction, when the amount of the acrylate based monomer is less than 30 mol % based on the total amount of the monomers, the copolymer may be in trouble in view of adhesiveness. On the other hand, when the amount of the acrylate based monomer is greater than 99 mol %, the copolymer may be easily broken in forming of film.

The 1-alkene-acrylate based copolymer of the present invention can preferably include ethylene-methyl methacrylate copolymer and an ethylene-methyl acrylate copolymer.

The 1-alkene-acrylate based copolymer of the present invention may have a glass transition temperature of 0~200° C.

The 1-alkene-acrylate based copolymer of the present invention may have a glass transition temperature of 20~170° C.

In addition, the ethylene-methyl methacrylate copolymer may have a glass transition temperature of 50~130° C. according to a reaction condition.

In addition, the ethylene-methyl acrylate copolymer may have a glass transition temperature of −50~20° C. according to a reaction condition.

In addition, the ethylene acrylate based copolymer may have a glass transition temperature of 20~125° C. according to a reaction condition.

The 1-alkene-acrylate based copolymer may have a number average molecular weight of 5,000~200,000 g/mol and a weight average molecular weight of 10,000~500,000 g/mol. When the number average molecular weight is less than 5,000 g/mol or when the weight average molecular weight is less than 10,000 g/mol, there may be a problem in properties of the polymer due to its low molecular weight. On the other hand, when the number average molecular weight is greater than 200,000 g/mol or when the weight average molecular weight is greater than 500,000 g/mol, there may be a problem in a process.

A temperature ($Td\_50$), that is 50% decomposition temperature (that 50% of the initial weight is decomposed), of the 1-alkene-acrylate based copolymer obtained from a thermogravimetric analysis (TGA) is preferably 350~500° C. When a PMMA single polymer is obtained without copolymerization, $Td\_50$ is less than 350° C. In addition, $Td\_50$ can be even 500° C. according to the amount of copolymerized 1-alkene.

In addition, $Td\_50$ of the ethylene-acrylate based copolymer obtained from a thermogravimetric analysis (TGA) is preferably 350~450° C.

An optical transmittance of the 1-alkene-acrylate based copolymer is preferably 80~100%, and more preferably 85~95%. As the optical transmittance of the 1-alkene-acrylate based copolymer increases, the 1-alkene-acrylate based copolymer is advantageous to use of optical products, such as an optical film. Accordingly, the 1-alkene-acrylate based copolymer having the optical transmittance of 80% or more is desired.

On the other hand, the present invention provides an 1-alkene-acrylate-norbornene terpolymer.

In the 1-alkene-acrylate-norbornene terpolymer, an amount of an acrylate monomer is 30~99 mol %, the other is consisted of an 1-alkene monomer and a norbornene monomer. That is, an amount of the 1-alkene monomer can be 0.1~69.9 mol %, and an amount of the norbornene monomer can be 0.1~69.9 mol %.

Among such terpolymers, an ethylene-methyl acrylate-norbornene terpolymer may have a glass transition temperature of 0~160° C. according to a reaction condition.

The norbornene monomer may include norbornene derivatives as well as norbornene, and such norbornene monomer is preferably a compound as represented in Formula 4.

ChemistryFigure 4

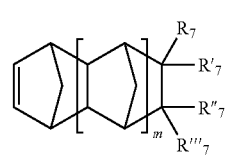

In the Formula 4, m is a positive number of 0~4, $R_7$, $R'_7$, $R''_7$ and $R'''_7$ are a polar functional group or a nonpolar functional group, respectively and independently.

$R_7$, $R'_7$, $R''_7$ and $R'''_7$ can form C4-C12 saturated or unsaturated cyclic group, or C6-C24 aromatic ring.

The nonpolar functional group is hydrogen; halogen; a linear or branched C1-C20 alkyl or haloalkyl; a linear or branched C2-C20 alkenyl or haloalkenyl; a linear or branched C2-C20 alkynyl or haloalkynyl; a linear or branched C1-C20 alkyl or haloalkyl, a linear or branched C2-C20 alkenyl or haloalkenyl, a linear or branched C2-C20 alkynyl or haloalkynyl, or halogen-substituted or unsubstituted C3-C12 cycloalkyl; a linear or branched C1-C20 alkyl or haloalkyl, a linear or branched C2-C20 alkenyl or haloalkenyl, a linear or branched C2-C20 alkynyl or haloalkynyl, or halogen-substituted or unsubstituted C6-C40 aryl; or a linear or branched C1-C20 alkyl or haloalkyl, a linear or branched C2-C20 alkenyl or haloalkenyl, a linear or branched C2-C20 alkynyl or haloalkynyl, or halogen-substituted or unsubstituted C7-C15 aralkyl;

The polar functional group is non-hydrocarbonaceous polar group including at least one oxygen, nitrogen, phosphorus, sulfur, silicon or boron, for example, $-R^8OR^9$, $-OR^9$, $-OC(O)OR^9$, $-R^8OC(O)OR^9$, $-C(O)R^9$, $-R^8C(O)R^9$, $-OC(O)R^9$, $-R^8C(O)OR^9$, $-C(O)OR^9$, $-R^8OC(O)R^9$, $-(R^8O)_k-R^9$, $-(R^8O)_k-OR^9$, $-C(O)-O-C(O)R^9$, $-R^8C(O)-O-C(O)R^9$, $-SR^9$, $-R^8SR^9$, $-SSR^9$, $-R^8SSR^9$, $-S(=O)R^9$, $-R^8S(=O)R^9$, $-R^8C(=S)R^9$, $-R^8C(=S)SR^9$, $-R^8SO_3R^9$, $-SO_3R^9$, $-R^8N=C=S$, $-NCO$, $-R^8-NCO$, $-CN$, $-R^8CN$, $-NNC(=S)R^9$, $-R^8NNC(=S)R^9$, $-NO_2$, $-R^8NO_2$,

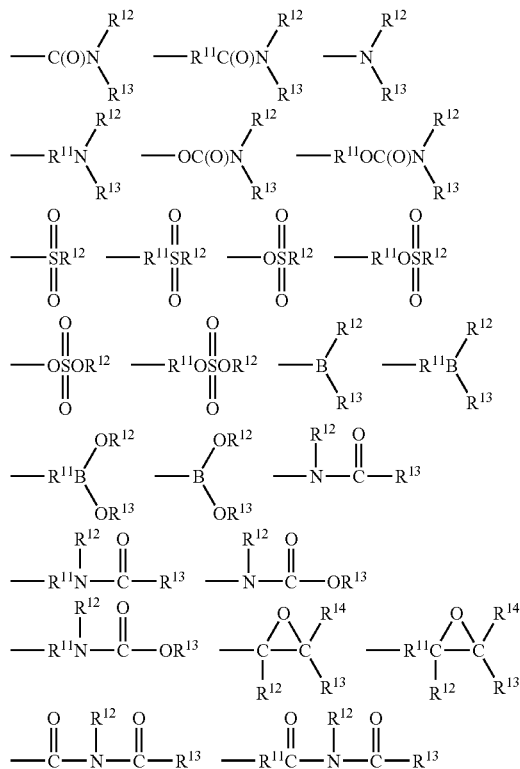

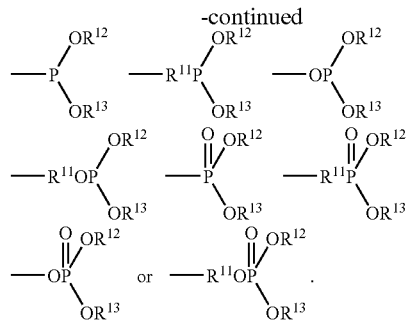

In the polar functional group, $R^8$ and $R^{11}$ are, respectively and independently, hydrogen; halogen; a linear or branched C1-C20 alkylene or haloalkylene; a linear or branched C2-C20 alkenylene or haloalkenylene; a linear or branched C2-C20 alkynylene or haloalkynylene; a linear or branched C1-C20 alkyl or haloalkyl, a linear or branched C2-C20 alkenyl or haloalkenyl, a linear or branched C2-C20 alkynyl or haloalkynyl, or halogen-substituted or unsubstituted C3-C12 cycloalkylene; a linear or branched C1-C20 alkyl or haloalkyl, a linear or branched C2-C20 alkenyl or haloalkenyl, a linear or branched C2-C20 alkynyl or haloalkynyl, or halogen-substituted or unsubstituted C6-C40 arylene; or a linear or branched C1-C20 alkyl or haloalkyl, a linear or branched C2-20 alkenyl or haloalkenyl, a linear or branched C2-20 alkynyl or haloalkynyl, or halogen-substituted or unsubstituted C7-C15 aralkylene;

$R^9$, $R^{12}$ and $R^{13}$ are, respectively and independently, hydrogen; halogen; a linear or branched C1-C20 alkyl or haloalkyl; a linear or branched C2-C20 alkenyl or haloalkenyl; a linear or branched C2-C20 alkynyl or haloalkynyl; a linear or branched C1-C20 alkyl or haloalkyl, a linear or branched C2-C20 alkenyl or haloalkenyl, a linear or branched C2-C20 alkynyl or haloalkynyl, or halogen-substituted or unsubstituted C3-C12 cycloalkyl; a linear or branched C1-C20 alkyl or haloalkyl, a linear or branched C2-C20 alkenyl or haloalkenyl, a linear or branched C2-C20 alkynyl or haloalkynyl, or halogen-substituted or unsubstituted C6-C40 aryl; or a linear or branched C1-C20 alkyl or haloalkyl, a linear or branched C2-C20 alkenyl or haloalkenyl, a linear or branched C2-C20 alkynyl or haloalkynyl, or halogen-substituted or unsubstituted C7-C15 aralkyl; a linear or branched C1-C20 alkoxy, or haloalkoxy; carbonyloxy or halocarbonyloxy;

each of k is a positive number of 1~10.

The norbornene is, more preferably, at least one selected from 5-ethylester-2-norbornene, t-butyl-5-norbornene-2-carboxylate (NB-TBE), methyl-5-norbornene-2-methyl-2-carboxylate(Nb-MMA), 5-methylene-2-norbornene, norbornene, and 5-n-butyl-2-norbornene.

In addition, the present invention provides a method of preparing an 1-alkene-acrylate based copolymer comprising the step of polymerization of a monomer mixture including 1-alkene and an acrylate monomer by a radical polymerization initiator under presence of a metal oxide or a Lewis acid.

The 1-alkene and the acrylate monomers used in the method of the present invention are the same as the monomer consisting of a repetitive unit in the 1-alkene-acrylate based copolymer, as repetitive units.

Amounts of the 1-alkene monomer and the acrylate based monomer used in the present invention are the same as described above. That is, the amount of the acrylate based monomer is 30~99 mol %, preferably 35~99 mol % or 40~99 mol %, more preferably 50~99 mol % or 50~95 mol %, and further preferably 50~90 mol %. In addition, in the 1-alkene-acrylate based copolymer, mole ratio of the 1-alkene (A) to the acrylate based monomer (B) can be 45~55 to 55~45, preferably 50 to 50. In particular, an 1-alkene-acrylate based copolymer that is copolymerized alternatively in the A-B-A-B- form by reacting the 1-alkene (A) with the acrylate monomer (B) having the mole ratio of 50 to 50 can be prepared.

As for Lewis acid and a metal oxide represented in the present specification, since the metal oxide used in the present invention acts as Lewis acid, which provides substantially an acid site in the polymerization reaction of the present invention, the metal oxide is conceptually included in Lewis acid. However, unlike other general Lewis acids, the metal oxide has additional advantages that the metal oxide does not change its structure or composition even after the polymerization reaction so that it can be easily separated and reused. Accordingly, in the present specification, it is named as metal oxide or complex metal oxide, for the purpose of distinguishing from the other general Lewis acids.

The metal oxide used in the present invention may be preferably a compound as represented in Formula 5.

$$M_xN_yO_z \qquad \text{ChemistryFigure 5}$$

In the Formula 5,

M is at least one selected from the group consisting of alkali earth metals, transition metals, 13 group and 14 group metals;

N is a 5 group or 6 group atom;

O is oxygen atom;

x, y and z are, respectively a value determined by state of oxidation of M and N, x>0, y≧0 and z>0.

The metal oxide can be, more particularly, at least one selected from the group of metal oxides consisting of $Al_2O_3$, $Y_2O_3$, $ZrO_2$, $HfO_2$, $SiO_2$, $B_2O_3$, $CeO_2$, $Dy_2O_3$, $Er_2O_3$, $Eu_2O_3$, $Gd_2O_3$, $Ho_2O_3$, $La_2O_3$, $Lu_2O_3$, $Nd_2O_3$, $Pr_6O_{11}$, $Sm_2O_3$, $Tb_2O_3$, $Th_2O_3$, $Tm_2O_3$, $Yb_2O_3$, SnO and $TiO_2$; and complex metal oxides consisting of $Dy_3Al_5O_{12}$, $Y_3Al_5O_{12}$, $Al_2O_3 \cdot TiO_2$, $3Al_2O_3 \cdot SiO_2$, $CaTiO_3$, $CaZrO_3$, $FeTiO_3$, $MgO \cdot Al_2O_3$, $CeAl_{11}O_{18}$, $Al_2(SO_4)_3$, and $AlPO_4$, but is not limited thereto.

The metal oxide can be used in the range of 0.01~200 mol % based on the acrylate based monomer in the method of preparing the 1-alkene-acrylate based copolymer.

When an amount of the metal oxide is less than 0.01 mol %, there is a problem that an amount of the 1-alkene monomer is low in the copolymer. On the other hand, when an amount of the metal oxide is greater than 200 mol %, there is no problem in use of a column-type polymerization device but there is a problem that a stirring velocity decreases in use of a stirring polymerization device. Accordingly, when the stirring polymerization device is used, it is desired to use the metal oxide of less than 200 mol %.

Since the metal oxide used in the present invention can be recovered nearly 100% by a physical method using only filtering device and the recovered metal oxide can be reused for the polymerization, such metal oxide provides advantages that the copolymer can be obtained economically with high purity. In addition, additional processes in the former and post stage for use of the metal oxide, such as acid treatment, dry and burning processes in both initial use and reuse are not required, and the only metal oxide itself is used. Accordingly, the process is simple. The recovered metal oxide can be reused generally more than 20 times.

The Lewis acid used in the present invention can be a Lewis acid of chloride and fluoride compounds, such as boron trifluoride, ethylboron dichloride, boron trifluoride, boron tribromide, boron triiodide, aluminum trichloride, aluminum tribromide, ethylaluminum dichloride, ethylaluminum sesquichloride, diethylaluminum chloride, stanic chloride, zinc dichloride, copper dichloride, and nikel chloride; or a Lewis acid of triflate compounds, such as aluminum triflate, scandium triflate, copper triflate, yttrium triflate, and zinc triflate, or a mixture thereof.

However, the Lewis acid is not limited to these materials, and can be an inorganic or organic metal compound whose cation is selected from the group consisting of scandium, titanium, vanadium, chrome, manganese, iron, cobalt, copper, zinc, boron, aluminum, yttrium, zirconium, niobium, molybdenum, cadmium, rhenium, and tin.

For example, such inorganic or organic metal compound can be $ZnBr_2$, $ZnI_2$, $ZnCl_2$, $ZnSO_4$, $CuCl_2$, CuCl, $Cu(O_3SCF)$, $CoCl_2$, $CoI_2$, $FeI_2$, $FeCl_3$, $FeCl_3$, $FeCl_2(THF)$, $TiCl_3$ (THF), $TiCl_4$, $TiCl_3$, $ClTi(O-i-propyl)$ $MnCl_2$, $ScCl_3$, $AlCl_3$, $(C_8H_{17})AlCl_2$, $(C_8H_{17})_2$ AlCl, $(i-C_4H_9)_2AlCl$, $(C_6H_5)_2$ AlCl, $(C_6H_5)AlCl_2$, $ReCl_5$, $ZrCl_4$, $NbCl_5$, $VCl_3$, $CrCl_2$, $MoCl_5$, $YCl_3$, $CdCl_2$, $LaCl_3$, $Er(O_3SCF_3)_3$, $Yb(O_2CCF_3)_3$, $SmCl_3$, $B(C_6H_5)$ and $TaCl_5$, disclosed in U.S. Pat. Nos. 6,127,567; 6,171,996; and 6,380,421. The inorganic or organic metal compound can also be a metal salt, such as $ZnCl_2$, $CoI_2$ and $SnCl_2$; an organometallic compound, such as $RAlCl_2$, $RSnO_3SCF_3$ and $R_3B$ (R is an alkyl group or an aryl group), disclosed in U.S. Pat. Nos. 3,496,217; 3,496,218; and 4,774,353.

The inorganic or organic metal compound may comprise an anionic moiety selected from the group consisting of halides, such as fluorides, chlorides, bromides, and iodides; triflates; low aliphatic anions having 2~7 carbons; $HPO_3^{2-}$; $H_3PO^{2-}$; $CF_3COO^-$; $C_7H_{15}OSO^{2-}$; or $SO_4^{2-}$, and a cation metal moiety selected from the group consisting of zinc, cadmium, beryllium, aluminum, gallium, indium, thallium, titanium, zirconium, hafnium, erbium, germanium, tin, vanadium, niobium, scandium, chrome, molybdeum, tungsten, manganese, rhenium, palladium, thorium, iron, and cobalt, preferably the group consisting of zinc, cadmium, titanium, tin, chrome, iron, and cobalt, disclosed in U.S. Pat. No. 3,773,809.

U.S. Pat. No. 3,773,809 disclosed examples of a cocatalyst, including borohydride, organic borohydride, and a boronic salt such as $R_3B$ or $B(OR)_3$ (R is selected from hydrogen, a C6-C18 aryl group, an aryl group substituted with a C1-C7 alkyl group, an aryl group substituted with a cyano-substituted C1-C7 alkyl group, preferably triphenylborone).

The Lewis acid used in the present invention can be a cocatalyst disclosed in U.S. Pat. Nos. 3,496,217; 3,496,218; 4,774,353; 4,874,884; 6,127,567; 6,171,996; and 6,380,421.

In particular, the Lewis acid can be a metal salt, preferably metal halide, such as fluorides, chlorides, bromides, and iodides, and preferably chlorides, and amongst the aluminum trichloride, zinc chloride, iron chloride(II), and iron chloride (III) are preferable.

In the method of preparing the 1-alkene-acrylate based copolymer, an amount of the Lewis acid can be in the mole range of 0.01~1 mole to 1 mole of the acrylate based monomer. When the amount of the Lewis acid is less than 0.01 mol %, the copolymer is not prepared. On the other hand, when the amount of the Lewis acid is greater than 1 mol %, the amount of the Lewis acid to be post treated is high after the copolymer is prepared.

In the method using the metal oxide or Lewis acid as described above, unlike the conventional technique, the process is simple by avoiding the harsh condition of high temperature and high pressure and an efficiency of the process is very high. In addition, it can be easily recovered nearly 100% through only filtering device after polymerization and thus recycled. As a result, a cost of preparation can be low, and the metal oxide has an excellent moisture stability so that the resultant efficiency can be improved, and the polymerization process can be simplified. Accordingly, the present invention can be largely applied in an industrial scale.

Specifically, in a method of preparing the 1-alkene-acrylate based copolymer of the present invention, for example, an ethylene-acrylate based copolymer, unlike the conventional technique, the process is simple and properties of the copolymer can be easily controlled by preparing the copolymer in a mild condition of 100° C. or less and 200 bar or less. Since the ethylene-acrylate based copolymer prepared by the method is a random copolymer of ethylene and the polar monomer and the amount of a polar group of the polar monomer is so high that the crystallinity of the ethylene monomer does not remain in the copolymer, the ethylene-acrylate based copolymer may keep its transparency after processing to a polymer film and thus may be used for optical products.

In the method of preparing the 1-alkene-acrylate based copolymer, the reaction may be performed using a polymerization initiator, preferably a free radical polymerization initiator. The polymerization initiator can be at least one selected from the group consisting of peroxides, azo compounds, and their mixtures.

Specifically, examples of the peroxides include hydrogen peroxide, decanonyl peroxide, t-butyl peroxy neodecanoate, t-butyl peroxy pivalate, 3,5,5-trimethyl hexanoyl peroxide, diethyl peroxide, t-butyl peroxy-2-ethyl hexanoate, t-butyl peroxy isobutylate, benzoyl peroxide, t-butyl peroxy acetate, t-butyl peroxy benzoate, dit-butyl peroxide, t-amyl peroxy neodecanoate, t-amyl peroxy pivalate, t-amyl peroxy-2-ethyl hexanoate and 1,1,3,3-tetramethyl butyl hydroperoxide; and alkali metal persulfates, perborates, and percarbonates. Examples of the azo compounds include azo bisisobutironitrite (AIBN).

The initiator can be preferably the azo compound. A mixture of such initiators can be used. The initiator can be added in an appropriate form into a reaction stream. For example, the initiator can be added in a pure form and a form dissolved in an appropriate solvent and/or in a form stirred with a monomer or a monomer supply stream.

The polymerization initiator may be in the range of 0.001~1 mol % based on 100 mol % of the acrylate based monomer. When the amount of the initiator is less than 0.001 mol %, the yield is low. On the other hand, when the amount of the initiator is greater than 1 mol %, a copolymer having a low molecular weight can be formed due to an excess amount of the initiator.

In the method of preparing the 1-alkene-acrylate based copolymer, when the polymerization is performed under presence of a solvent, the solvent can be selected from the group consisting of toluene, chlorobenzene, n-hexane, tetrahydrofuran, chloroform, and methylenechloride, but is not limited thereto, and solvents used in the art is available.

In the polymerization reaction of the present invention, a reaction pressure is not limited since the acrylate based monomer generally exists in a liquid phase under the reaction condition and such monomer is dissolved in a solvent and then can be used in the polymerization reaction.

On the other hand, since the 1-alkene monomer, particularly, ethylene or propylene exists in gas phase under the reaction condition, a reaction condition of some pressure is required so that the 1-alkene monomer is added in a repetitive unit of the copolymer of the present invention with an appropriate amount. On the other hand, when the 1-alkene monomer is 1-hexene and 1-decene existing in a liquid state, the reaction pressure is not limited.

In the present invention, when the 1-alkene monomer is ethylene existing in gas phase, the remaining ethylene that has not reacted monomer can be collected and reused.

The reaction condition of the present invention may be in a pressure of 5~200 bar (when the 1-alkene monomer is in the gas phase, such as ethylene or propylene) and a temperature of 40~150° C., preferably in a pressure of 20~50 bar and a temperature of 50~80° C.

When the pressure is less than 5 bar, the amount of the 1-alkene is low in the polymer. On the other hand, when the pressure is greater than 200 bar, an additional device in process is required. When the temperature is less than 40° C., a velocity of activation of the initiator is slow and it is not easy to control the reaction temperature. On the other hand, the temperature is greater than 150° C., an excess of the unreacted monomers may occur and it is difficult to control the process.

In the method of preparing the 1-alkene-acrylate based copolymer according to an embodiment of the present invention, the acrylate based monomer can be methyl methacrylate or methyl acrylate, the 1-alkene can be ethylene or a mixture of ethylene and norbornene, and the metal oxide can be oxide aluminum, under the reaction pressure of 5~60 bar at the reaction temperature of 50~80° C., using the polymerization initiator, such as AIBN.

In the method of preparing the 1-alkene-acrylate based copolymer according to another embodiment of the present invention, the acrylate based monomer can be methyl methacrylate, and the Lewis acid can be aluminum trichloride, under the reaction pressure of 5~60 bar at the reaction temperature of 60~80° C., using the polymerization initiator, such as AIBN.

The present invention provides a method of preparing an alkene-acrylate based copolymer comprising the step of polymerization of a monomer mixture consisting of an alkene and an acrylate based monomer by a radical polymerization initiator in the presence of a metal oxide.

In the present invention, the alkene is a hydrocarbon compound having at least one carbon-carbon double bond, such as an aliphatic hydrocarbon compound, a norbornene cyclic hydrocarbon compound, and an aromatic hydrocarbon compound. The alkene of the present invention can be 2-butene, 2-pentene, 2-hexene, 3-hexene, 2-heptene, 2-octene, and 2-nonene, having a double bond in the middle of carbon chain, as well as 1-alkene; and norbornene or norbornene derivatives, particularly the norbornene compound. The alkene monomer used in the present invention can be a mixture of at least different kinds of the alkene monomers, for example, a mixture of ethylene and the norbornene compound.

In the method of preparing the alkene-acrylate based copolymer, the acrylate monomer, the metal oxide, the polymerization initiator and the amounts thereof, and polymerization reaction condition are the same as described above. A composition and properties of the copolymer prepared also are the same as described above.

The present invention provides an optical film including the alkene-acrylate based copolymer, preferably the 1-alkene-acrylate based copolymer, and more preferably the ethylene-acrylate based copolymer prepared by the method above. The optical film may have a high optical transmittance due to being made from the copolymer resin having a high optical transmittance. The optical film is suitable for a deposition film, such as a polarized film because of its high adhesiveness resulting from a large amount of the monomer having the polar functional group. Accordingly, the optical film can be used as a phase difference compensation film having a double refraction index through stretching, as a polarized film through a post treatment with an iodine solution, and as other various optical films.

The present invention provides an ethylene-acrylate based copolymer having the range of new composition that an amount of ethylene can be easily controlled. In particularly, the present invention provides the ethylene-acrylate based copolymer consisting of ethylene of 10~50 mol % and acrylate of 50~90 mol %, and having a weight average molecular weight of 30,000 g/mol or more. The amount of ethylene of the copolymer according to the present invention can preferably be 15~40 mol %, and the weight average molecular weight can preferably be 70,000 g/mol or more.

The ethylene-acrylate based copolymer having the specific range provided in the present invention is a random copolymer of ethylene and a polar monomer. The copolymer also has a high amount of a polar group and the amount can be controlled. As a result, a film having high mechanic properties and oxygen blocking can be produced. In particularly, since a crystallinity of ethylene does not remain in the copolymer, it does not affect a transparency of the polymer after processing into the polymer film and thus may be applied into a high transparent resin for blocking oxygen and other gases. An amount of ethylene in the ethylene-acrylate based copolymer according to the present invention is an important factor to improve mechanical properties, such as flexibility and stretching, and an amount of acrylate is an important factor to improve an oxygen blocking and transparency of the film. Accordingly, by controlling amounts of the two monomers properly, a resin and film having the appropriate transparency, mechanic properties, and gas blocking effect concurrently may be produced.

An amount of ethylene used in the ethylene-acrylate based copolymer can be 10~50 mol %, preferably 15~40 mol %. When the amount of ethylene is less than 10 mol %, the copolymer is not suitable for a film due a flexibility and stretching. On the other hand, when the amount of ethylene is greater than 50 mol %, even though the film is advantageous in the view of mechanical toughness, a transparency of the film decreases, a reactivity of ethylene is lower than that of acrylate and thus it is difficult or impossible to fulfill the polymerization technically. In particularly, when an amount of ethylene is in the range of 15~40 mol %, the technical embodiment is easy and the mechanical intensity improves. The weight average molecular weight of the ethylene-acrylate based copolymer can be 30,000 g/mol or more, preferably 70,000 g/mol or more. The value of maximum of the weight average molecular weight does not need to be limited. When the weight average molecular weight of the ethylene-acrylate based copolymer is less than 30,000 g/mol, the mechanical intensity of the film decreases. On the other hand, when the weight average molecular weight is greater than 70,000 g/mol, the mechanical intensity, such as tension intensity increases.

BRIEF DESCRIPTION OF THE DRAWINGS

FIG. 1 illustrates a $^1$H-NMR spectrum of an ethylene-methyl acrylate copolymer obtained according to Example 3.

FIG. 2 illustrates a $^1$H-NMR spectrum of an norbornene-methyl acrylate copolymer obtained according to Example 7.

FIG. 3 illustrates a $^{13}$C-NMR spectrum of an ethylene-norbornene-methyl acrylate terpolymer obtained according to Example 8.

FIG. 4 is a graph illustrating results of differential scanning calorimetry (DSC) of copolymers obtained according to Examples 1, 5 and 8.

FIG. 5 illustrates results of a thermogravimetric analysis (TGA) of copolymers obtained according to Example 3.

FIG. 6 illustrates results of a thermogravimetric analysis (TGA) of copolymers obtained according to Example 6.

FIG. 7 is a graph illustrating results of a gel permeation chromatography (GPC) analysis of copolymers obtained according to Examples 3, 4, 5 and 6.

FIG. 8 illustrates a $^{13}$C-NMR spectrum of an ethylene-methyl methacrylate copolymer obtained according to Example 20.

FIG. 9 is a graph illustrating results of differential scanning calorimetry (DSC) of copolymers obtained according to Examples 9, 13 and 17.

FIG. 10 illustrates results of a thermogravimetric analysis (TGA) of copolymers obtained according to Examples 10, 12 and 16.

FIG. 11 is a graph illustrating results of a gel permeation chromatography (GPC) analysis of copolymers obtained according to Examples 1, 14 and 15.

FIG. 12 illustrates a UV-Visible spectrum of an ethylene-methyl methacrylate copolymer obtained according to Example 20.

FIG. 13 illustrates results of a contact angle of an ethylene-methyl methacrylate copolymer obtained according to Example 11.

BEST MODE FOR CARRYING OUT THE INVENTION

Hereinafter, the present invention will be described in further detail through examples. However, the following examples are only for the understanding of the invention and the invention is not limited to or by them.

Organic reagents and solvents used in the polymerization were produced by Aldrich Co. and refined by a standard method. Ethylene was prepared by passing a high purity product produced by Applied Gas Technology Co. through moisture and an oxygen filtering device, and then used in the polymerizing process.

The structures of polymers were identified based on its spectrum obtained using a 500 MHz NMR device produced by Varian Co. The glass transition temperatures of polymers were obtained using DSC Q100 produced by TA Instrument Co., and Td_50 of the polymers were obtained using TGA produced by TA Instrument Co.

The molecular weights and molecular weight distributions of copolymers obtained according to Examples 1~8 were obtained through gel permeation chromatography (GPC) analysis in Waters Co. The analysis temperature was 25° C., and tetrahydrofuran (THF) was used as a solvent. The copolymers were standardized using polystyrene in order to obtain the number average molecular weights (Mn) and weight average molecular weights (Mw) thereof.

The molecular weights and molecular weight distributions of the copolymers obtained according to Examples 9~26 were obtained through gel permeation chromatography (GPC) analysis using PL-GPC220 produced by Polymer Lab. Co. The analysis temperature was 160?, and trichlorobenzene was used as a solvent. The copolymer was standardized using polystyrene to obtain number average molecular weights (Mn) and weight average molecular weights (Mw) thereof.

Examples 1~8

Preparations of Alkene-Acrylate Based Copolymers Under Presence of a Metal Oxide Example 1

A 125 ml high-pressure reactor was evacuated and then filled with argon. Then 3.8 g (37.4 mmol) of aluminum oxide, 10 ml of toluene, and 2 ml (18.7 mmol) of methyl methacrylate were added to the reactor. 0.082 mmol of AIBN acting as an initiator dissolved in toluene was also added to the reactor. Then the reactor was filled with 35 bar of ethylene and then the temperature of the reactor was increased to 70° C. and the reaction mixture was stirred in 500 rpm using a magnetic bar. Then the polymerization was performed in such a reactor for 20 hours.

After the polymerization reaction, the reaction temperature was dropped to room temperature and then the aluminum oxide was recovered through filtering. Then the solution of the polymer in which the metal oxide was removed was added to ethanol acting as a non-solvent, and then the polymer was precipitated with solid phase. Then the solid phase was sunk and then the supernatant liquid was removed. Then ethanol was added to wash the remaining solid phase and then water was added thereto and stirred to make solid particles. Then a copolymer was recovered through filtering. The recovered copolymer was dried for a day at 60° C. in a vacuum oven.

Example 2

A 2 L high-pressure reactor was evacuated and then filled with argon. Then 228.7 g (2.24 mol) of aluminum oxide, 300 ml of toluene, and 120 ml (1.12 mol) of methyl methacrylate were added to the reactor. 4.93 mmol of AIBN acting as an initiator dissolved in toluene was also added to the reactor. Then the reactor was filled with 35 bar of ethylene and then a temperature of the reactor was increased to 60° C. and stirred in 250 rpm using a mechanical agitator. Then the polymerization was performed in such reactor for 18 hours. A post treatment processing is the same as Example 1.

Specific experimental conditions used in Examples 1~2 and results thereof are illustrated in Table 1.

Example 3

A 125 mL high-pressure reactor was evacuated and then filled with argon. Then 2.3 g (22.2 mmol) of aluminum oxide, 10 ml of toluene, and 3.8 g (44.4 mmol) of methyl methacrylate were added to the reactor. 0.22 mmol of AIBN acting as an initiator dissolved in toluene was also added to the reactor. Then the reactor was filled with 35 bar of ethylene and then a temperature of the reactor was increased to 60° C. and stirred in 500 rpm using a mechanical mixer. Then the polymerization was performed in such reactor for 20 hours. A post treatment processing is the same as Example 1.

Example 4

The polymerization was performed in the same conditions and method as Example 3, except that 0.16 mmol of AIBN was also added to the reactor.

Specific experimental conditions used in Examples 3~4 and results thereof are illustrated in Table 2.

TABLE 2

| Section | MA:Al$_2$O$_3$ (mole ratio) | AIBN:MA (mole ratio) | Pressure of ethylene (bar) | Temperature (° C.) | time (hr) | Amount of ethylene (mol %) | Tg (° C.) | Td_50 (° C.) | Mw (g/mol) | PDI |
|---|---|---|---|---|---|---|---|---|---|---|
| Example 3 | 1:0.5 | 0.5:100 | 35 | 60 | 20 | 18.7 | 10.1 | 419.1 | 87700 | 2.2 |
| Example 4 | 1:0.5 | 0.37:100 | 35 | 60 | 20 | 20.6 | 9.3 | 412.2 | 96900 | 2.1 |

Example 5

A 125 mL high-pressure reactor was evacuated and then filled with argon. Then 2.3 g (22.2 mmol) of aluminum oxide, 20 ml of toluene, 3.8 g (44.4 mmol) of methyl methacrylate, and 88.84 mmol of norbornene were added to the reactor. 0.22 mmol of AIBN acting as an initiator dissolved in toluene was also added to the reactor. Then a temperature of the reactor was increased to 60° C. and stirred in 500 rpm using a magnetic bar. Then the polymerization was performed in such reactor for 16 hours. A post treatment processing is the same as Example 1.

Example 6

The experiment was performed in the same conditions and method as in Example 5, except that a temperature of the

TABLE 1

| Section | MMA:Al$_2$O$_3$ (mole ratio) | AIBN:MMA (mole ratio) | Pressure of ethylene (bar) | Temperature (° C.) | time (hr) | Amount of ethylene (mol %) | Tg (° C.) | Td_50 (° C.) | Mw (g/mol) | PDI | Recovered Al$_2$O$_3$ (weight %) |
|---|---|---|---|---|---|---|---|---|---|---|---|
| Example 1 | 1:2 | 0.44:100 | 35 | 70 | 20 | 10.7 | 102 | — | 52500 | 1.4 | 99 |
| Example 2 | 1:2 | 0.44:100 | 35 | 60 | 18 | 29.7 | 84 | — | — | — | 98 | reactor was increased to 60° C. and the polymerization was performed in such reactor for 16 hours.

Example 7

A 125 mL high-pressure reactor was evacuated and then filled with argon. Then 6.8 g (66.6 mmol) of aluminum oxide, 10 ml of toluene, 6 mL (66.6 mmol) of methyl methacrylate, and 133.3 mmol of norbornene were added to the reactor. 0.29 mmol of AIBN acting as an initiator dissolved in toluene was also added to the reactor. Then a temperature of the reactor was increased to 70° C. and stirred in 500 rpm using a magnetic bar. Then the polymerization was performed in such reactor for 18 hours. A treatment processing in the later stage is the same as Example 1.

Specific experimental conditions used in Examples 5, 6 and 7 and results thereof are illustrated in Table 3.

TABLE 3

| Section | MA:Al$_2$O$_3$ (mole ratio) | AIBN:MA (mole ratio) | MA:Nb (mole ratio) | Temperature (° C.) | time (hr) | Amount of Nb (mol %) | Tg (° C.) | Td_50 (° C.) | Mw (g/mol) | PDI |
|---|---|---|---|---|---|---|---|---|---|---|
| Example 5 | 1:0.5 | 0.5:100 | 1:2 | 60 | 16 | 24.2 | 72.5 | 429.3 | 20200 | 2.1 |
| Example 6 | 1:0.5 | 0.5:100 | 1:2 | 65 | 20 | 24.8 | 74.7 | 434.0 | 29600 | 1.9 |
| Example 7 | 1:1 | 0.44:100 | 1:2 | 70 | 18 | 27.5 | 79.2 | 454.7 | 50700 | 2 |

Example 8

A 125 mL high-pressure reactor was evacuated and then filled with argon. Then 2.3 g (22.2 mmol) of aluminum oxide, 20 ml of toluene, 3.8 g (44.4 mmol) of methyl methacrylate, and 44.4 mmol of norbornene were added to the reactor. 0.22 mmol of AIBN acting as an initiator dissolved in toluene was also added to the reactor. Then the reactor was filled with 35 bar of ethylene and the a temperature of the reactor was increased to 65° C. and stirred in 500 rpm using a magnetic bar. Then the polymerization was performed in such reactor for 16 hours. A post treatment processing is the same as Example 1.

Specific experimental conditions used in Example 8 and results thereof are illustrated in Table 4.

TABLE 4

| Section | MA:Al$_2$O$_3$ (mole ratio) | AIBN:MA (mole ratio) | MA:Nb (mole ratio) | Pressure of ethylene (bar) | Temperature (° C.) | time (hr) | Tg (° C.) | Td_50 (° C.) | Mw (g/mol) | PDI |
|---|---|---|---|---|---|---|---|---|---|---|
| Example 8 | 1:0.5 | 0.5:100 | 1:1 | 35 | 65 | 16 | 34.7 | 427.3 | 85900 | 1.9 |

The structure of the copolymer obtained according to Examples 1~8 was identified using an NMR spectrum. It was found that ethylene or norbornene homo polymer was not formed and only a random copolymer was formed in each of the copolymer obtained according to Examples 1~8. A $^1$H-NMR spectrum of the copolymer obtained according to Examples 3 and 7 and a $^{13}$C-NMR spectrum of the copolymer obtained according to Example 8 were measured and results thereof are illustrated in FIGS. 1, 2 and 3.

DSC of the copolymers obtained according to Examples 1, 5 and 8, which is a part of the copolymers obtained according to Examples 1~8, was measured and results thereof are illustrated in FIG. 4. In FIG. 4, a typical melting temperature (Tm) of polyolefin did not appear but a glass transition temperature (Tg) according to each of Example appeared. Accordingly, it was found that the homo polymers were not formed and the copolymers prepared according to Examples 1, 5 and 8 were amorphous copolymers which did not experience a phase difference according to a change in temperature.

TGA of the copolymers obtained according to Examples 3 and 6 was measured and results thereof are illustrated in FIGS. 5 and 6. Td_50 of the copolymers according to the Examples 3 and 6 appeared in the vicinity of about 400° C. higher than a typical Td_50 of PMMA (polymethylmethacrylate) of 350° C. Accordingly, since the copolymers prepared according to Examples 3 and 6 are less decomposed even when used in a condition of high temperature, they can be used in electrical devices operating with heat.

GPC of the copolymers obtained according to Examples 3, 4, 5 and 6 was measured and results thereof are illustrated in FIG. 7. A molecular weight distribution of LDPE and EVA obtained under conventional conditions of high-temperature and high pressure was wide, that is, a PDI of LDPE and EVA was 4 or more. On the other hand, the molecular weight distribution of the copolymers obtained according to Examples 3, 4, 5 and 6 was narrow, that is, a PDI of the polymers was less than 2.5. When a polymer has such a narrow molecular weight distribution, various properties of the polymer can be improved.

In addition, as Examples 1~2, the aluminum oxide is recovered nearly 100% and the air and moisture stability increase so that the copolymer can be reused.

Examples 9~26

A Preparation of an 1-Alkene-Acrylate Based Copolymer Under Presence of Lewis Acid Examples 9~17

A 125 ml high-pressure reactor was evacuated and then filled with nitrogen. 30 ml of chlorobenzene was added to the reactor. Then the reactor was placed in a constant-temperature bath and the temperature was maintained constant. A suitable amount of aluminum trichloride based on 1 mol of methyl methacrylate (MMA) was added to the reactor, and then 6 ml of MMA was added thereto. Then the reactor was left for 30 minutes until the reaction temperature was stabilized. Then a suitable amount of AIBN was dissolved in 5 ml of chlorobenzene and added to the reactor. Then a pressure of ethylene was set in the reactor. The polymerization was performed for a suitable time and the reaction temperature was dropped to room temperature. Then, methanol acting as a non-solvent was added thereto and a copolymer was recovered through filtering. The recovered copolymer was dried at 60° C. in a vacuum oven. Properties of the copolymer were measured.

Specific experimental conditions used in Examples 9~17 and results thereof are illustrated in Table 5.

TABLE 5

| Section | MMA:AlCl₃ (mole ratio) | AIBN:MMA (mole ratio) | pressure of ethylene (bar) | Temperature (° C.) | Hour (hr) | Tg (° C.) | Td_50 (° C.) | Mn (g/mol) | Mw (g/mol) | PDI |
|---|---|---|---|---|---|---|---|---|---|---|
| Example 9 | 1:0.375 | 0.285:100 | 34 | 65 | 20 | 95.8 | 397 | 12,000 | 26,000 | 2.1 |
| Example 10 | 1:0.375 | 0.143:100 | 42 | 65 | 20 | 90.0 | 397 | 12,000 | 21,000 | 1.8 |
| Example 11 | 1:0.375 | 0.481:100 | 40 | 65 | 40 | 87.5 | 401 | 15,000 | 28,000 | 1.9 |
| Example 12 | 1:0.751 | 0.128:100 | 40 | 65 | 40 | 108.3 | 406 | 4,000 | 5,000 | 1.3 |
| Example 13 | 1:1.000 | 0.481:100 | 50 | 65 | 60 | 124.8 | 379 | 11,000 | 20,000 | 1.8 |
| Example 14 | 1:0.375 | 0.283:100 | 5 | 65 | 60 | 36.7 | 429 | 10,000 | 16,000 | 1.6 |
| Example 15 | 1:0.500 | 0.321:100 | 45 | 65 | 40 | 90.4 | 401 | 14,000 | 27,000 | 1.9 |
| Example 16 | 1:1.000 | 0.321:100 | 45 | 65 | 40 | 42.0 | 427 | 7,000 | 11,000 | 1.5 |
| Example 17 | 1:1.000 | 0.321:100 | 50 | 70 | 40 | 31.1 | 430 | 7,000 | 10,000 | 1.5 |

Example 18

A 125 ml high-pressure reactor was evacuated and then filled with nitrogen. 15 ml of chlorobenzene was added to the reactor. Then the reaction temperature was fixed at 60° C. 0.5 mol of aluminum trichloride based on 1 mol of methyl methacrylate (MMA) was added to the reactor, and then 6 ml of MMA was added thereto. Then 0.4 mol of AIBN based on 100 mol of MMA was dissolved in 5 ml of chlorobenzene and added to the reactor. Then the pressure of ethylene was fixed at 20 bar. The polymerization was performed for 6 hours.

The glass transition temperature, number average molecular weight, and PDI of the obtained copolymer were 96° C., 101,000 g/mol, and 2.1, respectively.

Example 19

The experiment was performed in the same conditions as in Example 18, except that 0.2 mol of Cu(Tf)₂ acting as a Lewis acid based on 1 mol of MMA was added to the reactor and the reaction was performed for 60 hours.

The glass transition temperature, Td_50 obtained through TGA, the number average molecular weight, and PDI of the obtained copolymer were 75° C., 401° C., 11,000 g/mol, and 1.8, respectively.

Example 20

A 2 L high-pressure reactor was evacuated and then filled with nitrogen. 0.56 mol of AlCl₃ was added to the reactor. Then, 300 ml of toluene was added to the reactor and stirred at a stirring speed of 200 rpm for 30 minutes so that a complete dispersion state was obtained.

Then 1 mol of MMA was slowly added to the reactor and then the temperature of the reactor was gradually increased to 60° C. The reactor was left for 30 minutes. Then the reactor was filled with 20 bar of high-pressure ethylene and then the reaction was performed for 6 hours. Then the pressure of the reactor was removed and the temperature was dropped to room temperature. Ethanol was added to the reactor to produce a copolymer and the copolymer was recovered through filtering. The copolymer was repeatedly filtered using ethanol and water. The resultant copolymer was dried in a vacuum oven for 12 hours and then recovered.

The number average molecular weight, PDI, the amount of ethylene, and the glass transition temperature of the obtained copolymer were 112,000 g/mol, 1.9, 31 mol %, and 78° C., respectively.

Example 21

The experiment was performed in the same conditions as in Example 12, except that 0.1 mol of Sc(Tf)₃ (scandium triflate) acting as a Lewis acid based on 1 mol of MMA was added to the reactor.

The number average molecular weight and PDI of the obtained copolymer were 87,000 g/mol and 2.3, respectively.

Example 22

The experiment was performed in the same conditions as in Example 20, except that 0.1 mol of Zn(Tf)₂ (zinc triflate) acting as a Lewis acid based on 1 mol of MMA was added to the reactor.

The number average molecular weight and PDI of the obtained copolymer were 44,000 g/mol and 1.8, respectively.

Example 23

The experiment was performed in the same conditions as in Example 20, except that butyl methacrylate was used instead of methyl methacrylate as monomer.

The glass transition temperature of the obtained copolymer was 85° C.

Example 24

The experiment was performed in the same conditions as in Example 20, except that ethyl methacrylate was used instead of methyl methacrylate as monomer.

The glass transition temperature of the obtained copolymer was 22° C.

Examples 25 and 26

A 125 ml reactor was evacuated and then filled with nitrogen. 30 ml of toluene was added to the reactor. Then the reactor was placed in a constant-temperature bath and the temperature was maintained constant. A suitable amount of aluminum trichloride based on 1 mol of methyl methacrylate (MMA) was added to the reactor, and then MMA was added thereto. Then the reactor was left for 30 minutes until the reaction temperature was stabilized. Then a suitable amount of AIBN was dissolved in 5 ml of toluene and added to the reactor. 1-hexene was added to the reactor. The polymerization was performed for a predetermined time and the reaction temperature was dropped to room temperature. Then, ethanol acting as a non-solvent was added thereto and a copolymer was recovered through filtering. The recovered copolymer was dried at 70° C. in a vacuum oven. Properties of the copolymer were measured.

Specific experimental conditions used in Examples 25 and 26 and results thereof are illustrated in Table 6.

TABLE 6

| Section | MMA:AlCl$_3$ (mole ratio) | AIBN:MMA (mole ratio) | MMA:1-Hexene (mole ratio) | Temperature (° C.) | Hour (hr) | Amount of 1-Hexene (mol %) | Tg (° C.) | Mn (g/mol) | Mw (g/mol) | PDI |
|---|---|---|---|---|---|---|---|---|---|---|
| Example 25 | 1:0.2 | 0.2:100 | 1:3 | 70 | 18 | 22 | 76 | 22300 | 52300 | 2.34 |
| Example 26 | 1:0.5 | 0.1:100 | 1:3 | 70 | 18 | 31 | 63 | 63200 | 122000 | 1.91 |

The structure of the copolymer obtained according to Example 20 was identified using an NMR spectrum. The results are shown in HG. 8. It was found that an ethylene homo polymer was not formed and only a random copolymer was formed in the ethylene-methyl methacrylate copolymer.

DSC of the copolymers obtained according to Examples 9, 13 and 17, which is a part of the copolymers obtained according to Examples 9~24, was measured and results thereof are illustrated in FIG. 9. In FIG. 9, a typical melting temperature of polyolefin did not appear but a glass transition temperature (Tg) appeared in the range of 30-125° C. Accordingly, it was found that the copolymers prepared according to Examples 9, 13 and 17 were amorphous copolymers which did not experience a phase difference according to a change in temperature.

TGA of the copolymers obtained according to Examples 10, 12 and 16 was measured and results thereof are illustrated in FIG. 10. In FIG. 10, Td_50 of the copolymers according to the Examples 10, 12 and 16 appeared in the vicinity of about 400° C. higher than a typical Td_50 of PMMA (polymethylmethacrylate) of 350° C. That is, it was found that the copolymers prepared according to Examples 10, 12 and 16 had higher heat decomposition temperature than a conventional PMMA. Since the copolymers prepared according to Examples 10, 12 and 16 are less decomposed even when used in a condition of high temperature, they can be used in electrical devices operating with heat.

GPC of the copolymers obtained according to Examples 11, 14 and 15 was measured and results thereof are illustrated in FIG. 11. A molecular weight distribution of LDPE and EVA obtained under a conventional condition of high-temperature and high pressure was wide, that is, a PDI of LDPE and EVA was 4 or more. On the other hand, the molecular weight distribution of the copolymers obtained according to Examples 11, 14 and 15 was narrow, that is, a PDI of the polymers was less than 2.5. When a polymer has such a narrow molecular weight distribution, various properties of the polymer can be improved.

FIG. 12 illustrates a UV visible spectrum of a film prepared by dissolving the copolymer prepared according to Example 12 in THF. As shown in FIG. 12, the film showed excellent transmittance of 90%. In this experiment, 1 g of the copolymer was completely dissolved in 30 ml of THF using a magnetic stirrer and then a doctor blade was used to form the film. Accordingly, the copolymer can be used in various optical products.

Measurement Example: Measurement of Contact Angle

Contact angles of the copolymer prepared according to Example 11, a conventional high density polyethylene (HDPE, LUTENE-H), and a conventional ethylene-vinyl alcohol copolymer (EVOH, Soarnol) were measured using a contact angle measuring system G2 produced by KRUSS Co. Water and ethanol were used as a solvent. A solvent used was and contact angles were measured at room temperature. The results are shown in Table 7 and FIG. 13. The unit of the contact angle is [°].

TABLE 7

| Section | Water | Ethanol |
|---|---|---|
| Example 11 | 76.5 | 9.7 |
| HDPE | 96.4 | 25.3 |
| EVOH | 77.3 | 10.0 |

The copolymer obtained according to Example 11 showed a similar level of a hydrophilic property to EVOH which is known as a high hydrophilic material. Accordingly, the copolymer can be used in food packaging. In addition, by controlling the content ratio of ethylene and acrylate, the polymer may have various hydrophilic and hydrophobic properties and can be used in various applications.

Examples 27~37

A Preparation of an Ethylene-Acrylate Copolymer

Examples 27

A 2 L high-pressure reactor was evacuated and then filled with argon. Then 228.7 g (2.24 mol) of aluminum oxide, 300 ml of toluene, and 120 ml (1.12 mol) of methyl methacrylate were added to the reactor. 4.93 mmol of AIBN acting as an initiator dissolved in toluene was also added to the reactor. Then the reactor was filled with 35 bar of ethylene and then a temperature of the reactor was increased to 60° C. and stirred in 250 rpm using a mechanical mixer. Then the polymerization was performed in such reactor for 18 hours. After the polymerization reaction, the reaction temperature was dropped to room temperature and then the aluminum oxide was recovered through filtering. Then a solution of the polymer that the metal oxide was removed was added to ethanol acting as a non-solvent, and then the polymer was precipitated with solid phase. Then the solid phase was sunk and then an upper liquid was eliminated. Then ethanol was added to remaining solid phase to wash one more time and then water was added thereto and stirred. Then a ethylene-methyl methacrylate copolymer was recovered through filtering. The recovered copolymer was dried for a day at 60° C. in a vacuum oven. An amount of ethylene and weight average molecular weight of the obtained ethylene-methyl methacrylate copolymer were 29.7 mol % and 72,300 g/mol, respectively.

Example 28

The experiment was performed in the same conditions as in Example 27, except that 343.1 g (3.38 mol) of aluminum oxide was added to the reactor. As a result, an ethylene-methyl methacrylate copolymer that amount of ethylene and weight average molecular weight were 40.2 mol % and 79,000 g/mol, respectively, was obtained.

Example 29

The experiment was performed in the same conditions as in Example 27, except that 114.4 g (1.12 mol) of aluminum oxide was added to the reactor. As a result, an ethylene-methyl methacrylate copolymer that amount of ethylene and weight average molecular weight were 19.3 mol % and 69,500 g/mol, respectively, was obtained.

Example 30

The experiment was performed in the same conditions as in Example 27, except that 57.2 g (0.56 mol) of aluminum oxide was added to the reactor. As a result, an ethylene-methyl methacrylate copolymer that amount of ethylene and weight average molecular weight were 12.1 mol % and 67,500 g/mol, respectively, was obtained.

Example 31

The experiment was performed in the same conditions as in Example 27, except that 10 mmol of AIBN acting as an initiator dissolved in toluene was added to the reactor. As a result, an ethylene-methyl methacrylate copolymer that amount of ethylene and weight average molecular weight were 29.9 mol % and 38,000 g/mol, respectively, was obtained.

Example 32

The experiment was performed in the same conditions as in Example 27, except that 5 mmol of AIBN acting as an initiator dissolved in toluene was added to the reactor. As a result, an ethylene-methyl methacrylate copolymer that amount of ethylene and weight average molecular weight were 29.9 mol % and 80,000 g/mol, respectively, was obtained.

Example 33

The experiment was performed in the same conditions as in Example 27, except that 2.5 mmol of AIBN acting as an initiator dissolved in toluene was added to the reactor. As a result, an ethylene-methyl methacrylate copolymer that amount of ethylene and weight average molecular weight were 29.9 mol % and 145,000 g/mol, respectively, was obtained.

Comparative Example 1

The experiment was performed in the same conditions as in Example 27, except that aluminum oxide was not added to the reactor. As a result, an ethylene-methyl methacrylate copolymer that amount of ethylene and weight average molecular weight were 1.1 mol % and 89,000 g/mol, respectively, was obtained.

Comparative Example 2

The experiment was performed in the same conditions as in Example 27, except that 20 mmol of AIBN acting as an initiator dissolved in toluene was added to the reactor. As a result, an ethylene-methyl methacrylate copolymer that amount of ethylene and weight average molecular weight were 29.9 mol % and 21,000 g/mol, respectively, was obtained.

Comparative Example 3

The experiment was performed in the same conditions as in Example 27, except that 40 mmol of AIBN acting as an initiator dissolved in toluene was added to the reactor. As a result, an ethylene-methyl methacrylate copolymer that amount of ethylene and weight average molecular weight were 27.9 mol % and 15,000 g/mol, respectively, was obtained.

The amounts of acrylate and ethylene according to Examples 27~33 and Comparative Examples 2 and 3 that methyl methacrylate was used as the acrylate monomer are illustrated in Table 8.

TABLE 8

| Section | acrylate/amount (mol) | amount of aluminium oxide (mol) | amount of AIBN (mmol) | Amount of ethylene [mol %] | Mw [g/mol] |
|---|---|---|---|---|---|
| Example 27 | MMA/1.12 | 2.24 | 4.93 | 29.7 | 72,300 |
| Example 28 | MMA/1.12 | 3.38 | 4.93 | 40.2 | 79,000 |
| Example 29 | MMA/1.12 | 1.12 | 4.93 | 19.3 | 69,500 |
| Example 30 | MMA/1.12 | 0.56 | 4.93 | 12.1 | 67,500 |
| Example 31 | MMA/1.12 | 2.24 | 10.00 | 28.1 | 38,000 |
| Example 32 | MMA/1.12 | 2.24 | 5.00 | 28.4 | 80,000 |
| Example 33 | MMA/1.12 | 2.24 | 2.50 | 27.1 | 145,000 |
| Comparative Example 1 | MMA/1.12 | — | 4.93 | 1.1 | 89,000 |
| Comparative Example 2 | MMA/1.12 | 2.24 | 20.00 | 29.9 | 21,000 |
| Comparative Example 3 | MMA/1.12 | 2.24 | 40.00 | 27.9 | 15,000 |

* MMA: methyl methacrylate

Example 34

The experiment was performed in the same conditions as in Example 27, except that 120 ml (1.12 mol) of methyl acrylate and 114.4 g (1.12 mol) of aluminum oxide were added to the reactor instead of 120 ml (1.12 mol) of methyl methacrylate and 228.7 g (2.24 mol) of aluminum oxide, respectively. As a result, an ethylene-methyl acrylate copolymer that amount of ethylene and weight average molecular weight were 17.0 mol % and 130,000 g/mol, respectively, was obtained.

Example 35

The experiment was performed in the same conditions as in Example 27, except that 120 ml (1.12 mol) of methyl acrylate was added to the reactor instead of 120 ml (1.12 mol) of methyl methacrylate and 343.3 g (3.36 mol) of aluminum oxide was added to the reactor. As a result, an ethylene-methyl acrylate copolymer that amount of ethylene and weight average molecular weight were 28.4 mol % and 140,000 g/mol, respectively, was obtained.

Example 36

The experiment was performed in the same conditions as in Example 27, except that 120 ml (1.12 mol) of methyl acrylate was added to the reactor instead of 120 ml (1.12 mol) of methyl methacrylate and 10 mmol of AIBN acting as an initiator dissolved in toluene was added to the reactor. As a result, an ethylene-methyl acrylate copolymer that amount of ethylene and weight average molecular weight were 20.1 mol % and 65,000 g/mol, respectively, was obtained.

Example 37

The experiment was performed in the same conditions as in Example 27, except that 120 ml (1.12 mol) of methyl acrylate was added to the reactor instead of 120 ml (1.12 mol) of methyl methacrylate and 5 mmol of AIBN acting as an initiator dissolved in toluene was added to the reactor. As a result, an ethylene-methyl acrylate copolymer that amount of ethylene and weight average molecular weight were 21.1 mol % and 135,000 g/mol, respectively, was obtained.

Comparative Example 4

The experiment was performed in the same conditions as in Example 27, except that 120 ml (1.12 mol) of methyl acrylate was added to the reactor instead of 120 ml (1.12 mol) of methyl methacrylate and aluminum oxide was not added to the reactor. As a result, an ethylene-methyl acrylate copolymer that amount of ethylene and weight average molecular weight were 5.6 mol % and 120,000 g/mol, respectively, was obtained.

Comparative Example 5

The experiment was performed in the same conditions as in Example 27, except that 120 ml (1.12 mol) of methyl acrylate was added to the reactor instead of 120 ml (1.12 mol) of methyl methacrylate and 20 mmol of AIBN acting as an initiator dissolved in toluene was added to the reactor. As a result, an ethylene-methyl acrylate copolymer that amount of ethylene and weight average molecular weight were 21.1 mol % and 16,000 g/mol, respectively, was obtained.

The amounts of each component according to Examples 34~37 and Comparative Examples 4 and 5 are illustrated in Table 9.

TABLE 9

| Section | acrylate/amount (mol) | amount of aluminum oxide (mol) | amount of AIBN (mmol) | Amount of ethylene [mol %] | Mw [g/mol] |
|---|---|---|---|---|---|
| Example 34 | MA/1.12 | 1.12 | 4.93 | 17.0 | 130,000 |
| Example 35 | MA/1.12 | 3.36 | 4.93 | 28.4 | 140,000 |
| Example 36 | MA/1.12 | 2.24 | 10.00 | 20.1 | 65,000 |
| Example 37 | MA/1.12 | 2.24 | 5.00 | 21.0 | 135,000 |
| Comparative Example 4 | MA/1.12 | — | 4.93 | 5.6 | 120,000 |
| Comparative Example 5 | MA/1.12 | 2.24 | 20.00 | 21.1 | 16,000 |

* MA: methyl acrylate

Test Example

Properties Test According to Content Ratio of Ethylene and Molecular Weight

In order to find out a properties difference according to amount of ethylene and weight average molecular weight (Mw) of Examples 27~37 and Comparative Examples 1~5 that methyl acrylate is used as the acrylate monomer, a molecular weight distribution (PDI), a touhgness intensity and an elongation of polymers according to Examples 27~37 and Comparative Examples 1~5 were measured and results thereof are shown in Table 11.

An amount analysis of ethylene was measured through 500 MHz NMR produced by Varian Co., a molecular weight (Mw) and a molecular weight distribution (PDI, Mw/Mn) were measured through GPC (gel permeation chromatography) produced by Waters Co., and a toughness intensity and an elongation were measured through universal tense tester device (instron, M 4202) according to ASTM D638.

TABLE 10

| Section | Amount of MMA [mol %] | Amount of ethylene [mol %] | Mw [g/mol] | PDI | toughness intensity [kgf/cm$^2$] MD | TD | elongation [%] MD | TD |
|---|---|---|---|---|---|---|---|---|
| Example 27 | 70.3 | 29.7 | 72,300 | 1.45 | 850 | 834 | 134 | 117 |
| Example 28 | 59.8 | 40.2 | 79,000 | 1.56 | 865 | 847 | 156 | 136 |
| Example 29 | 80.7 | 19.3 | 69,500 | 1.41 | 823 | 811 | 121 | 107 |
| Example 30 | 87.9 | 12.1 | 67,500 | 1.45 | 813 | 800 | 120 | 106 |
| Example 31 | 71.9 | 28.1 | 38,000 | 1.44 | 823 | 813 | 143 | 127 |
| Example 32 | 71.6 | 28.4 | 80,000 | 1.65 | 865 | 857 | 141 | 131 |
| Example 33 | 72.9 | 27.1 | 145,000 | 1.67 | 860 | 841 | 151 | 139 |
| Comparative Example 1 | 98.9 | 1.1 | 89,000 | 2.21 | 721 | 711 | 14 | 10 |
| Comparative Example 2 | 70.1 | 29.9 | 21,000 | 1.34 | 543 | 515 | 101 | 89 |
| Comparative Example 3 | 72.1 | 27.9 | 15,000 | 1.33 | 134 | 109 | 89 | 77 |

* MMA: methyl methacrylate

TABLE 11

| Section | Amount of MA [mol %] | Amount of ethylene [mol %] | Mw [g/mol] | PDI | toughness intensity [kgf/cm$^2$] MD | TD | elongation [%] MD | TD |
|---|---|---|---|---|---|---|---|---|
| Example 34 | 83 | 17.0 | 130,000 | 1.66 | 797 | 774 | 100 | 89 |
| Example 35 | 71.6 | 28.4 | 140,000 | 1.65 | 821 | 809 | 124 | 112 |
| Example 36 | 97.99 | 2.01 | 65,000 | 1.45 | 788 | 767 | 99 | 88 |
| Example 37 | 78.8 | 21.2 | 135,000 | 1.75 | 817 | 801 | 117 | 101 |
| Comparative Example 4 | 94.4 | 5.6 | 120,000 | 1.90 | 740 | 706 | 34 | 25 |
| Comparative Example 5 | 78.9 | 21.1 | 16,000 | 1.29 | 598 | 585 | 78 | 71 |

* MA: methyl acrylate

In Table 10, it was found that the copolymer according to Comparative Example 1 that the amount of ethylene is less than 10 mol % has properties of lower toughness intensity and elongation, in comparison with the copolymers according to Examples 27~33 that the amount of ethylene is in the range of 10~50 mol %. It was also found that when the amount of ethylene is in the range of the present invention, the copolymers according to Examples 27~33 that the weight average molecular weight is less than 30,000 g/mol have higher toughness intensity and elongation and thus the mechanical intensity is improved, in comparison with the copolymers according to Comparative Examples 2 and 3 that the weight average molecular weight is less than 30,000 g/mol.

In Table 11, it was found that the copolymer according to Comparative Example 4 that the amount of ethylene is less than 10 mol % and Comparative Example 5 that the weight average molecular weight is greater than 3000 g/mol has properties of lower toughness intensity and elongation, in comparison with the copolymers according to Examples 34~37 that the amount of ethylene and the weight average molecular weight are in the range of the present invention.

INDUSTRIAL APPLICABILITY

An 1-alkene-acrylated based copolymer according to the present invention is a random copolymer of 1-alkene and a polar monomer, and an amount of a polar group contained in the copolymer is very high so that the ethylene is not crystalline. Accordingly, when the copolymer is processed into a polymer film, a transparency of the polymer is not affected. Due to such a feature, the copolymer can be used in optical products.

A method of preparing an alkene-acrylate based copolymer, particularly ethylene-acrylate copolymer according to the present invention can be used in mild conditions, such as at a pressure of 200 bar or less and at a temperature of 100° C. or less, unlike the conventional technique that conditions of high temperature and high pressure is required. As a result, the process is simple and properties of the copolymer can be easily controlled. In addition, a metal oxide according to the present invention has an excellent moisture stability so that a resultant efficiency can be improved, and can be recycled without an additional treatment process.

In addition, when the metal oxide is used as Lewis acid, it can be easily recovered nearly 100% through only filtering device after polymerization and thus recycled. As a result, a cost of preparation can be lowed, and the metal oxide has an excellent moisture stability so that a resultant efficiency can be improved. In addition, an additional treatment process of remaining catalyst is required so that the polymerization process can be simplified. Accordingly, the present invention can be largely applied in industrial scale.

The invention claimed is:

1. A method for preparation of an 1-alkene-acrylate based copolymer comprising the step of polymerization reaction of a mixture of monomer comprising 1-alkene and an acrylate based monomer with a radical polymerization initiator under presence of a metal oxide or Lewis acid, wherein the metal oxide is a compound as represented in Formula 5,

            Formula 5 where M is at least one selected from the group consisting of an alkali earth metal, a transition metal, a group 13 and group 14 metal; N is a group 5 or group 6 atom; 0 is an oxygen atom; x, y and z are a value determined by state of oxidation of M and N, and x>0, y≧0 and z>0; and the Lewis acid comprises a metal cation selected from the group consisting of scandium, titanium, vanadium, chrome, manganese, iron, cobalt, copper, zinc, boron, aluminum, yttrium, zirconium, niobium, molybdenum, cadmium, rhenium, and tin; and an anion selected from the group consisting of halide, triflate, $HPO_3^{2-}$, $H_3PO^{2-}$, $CF_3COO^-$, $C_7H_{15}OSO^{2-}$ and $SO_4^{2-}$, and wherein the acrylate based monomer is selected from the group consisting of a compound as represented in Formulas 2 and 3 and a mixture thereof

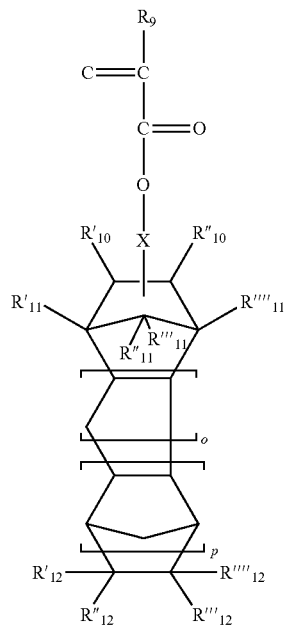

Formula 2

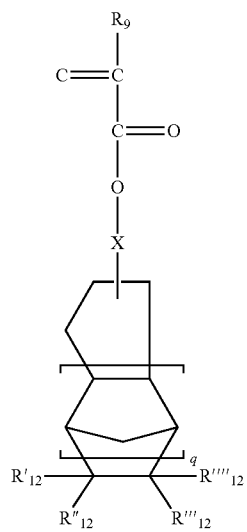

Formula 3 where o, p and q are a positive number of 0 to 2, respectively and independently, x is a (II) connector referred as single bond, $-(CH_2)_r-$, $-(C_2H_4O)_r-$, $-(C_3H_6O)_r-$ or $-(C_4H_8)_r-$, wherein r is a positive number of 1 to 5, $R_9$ is a hydrogen or methyl group, $R'_{10}$ and $R''_{10}$ are hydrogen, $R'_{11}$, $R''_{11}$, $R'''_{n}$ and $R''''_{11}$ are respectively and independently a hydrogen or methyl group, wherein one of $R'_{10}$, $R''_{10}$, $R'_{11}$, $R''_{11}$, $R'''_{11}$ and $R''''_{11}$ are substituted with the x group, and $R'_{12}$, $R''_{12}$, $R'''_{12}$, and $R''''_{12}$, are hydrogen; halogen; a substituted or unsubstituted C1-C20 hydrocarbon group, bonding directly to a cyclic structure

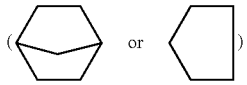

or bonding by a connector including oxygen, nitrogen and sulfur or silicon; or a polar group, respectively and independently.

2. The method according to claim 1, wherein the 1-alkene is ethylene and the polymerization reaction is performed at a pressure of 5 to 200 bar.

3. The method according to claim 1, wherein the polymerization reaction is performed at a temperature of 40 to 150° C.

4. The method according to claim 1, wherein the polymerization reaction is performed at a pressure of 5 to 200 bar and at a temperature of 40 to 150° C.

5. The method according to claim 1, wherein the polymerization reaction is performed at a pressure of 20 to 50 bar and at a temperature of 40 to 80° C.

6. The method according to claim 1, wherein the 1-alkene is ethylene, and the Lewis acid is aluminum trichloride, respectively, and the polymerization reaction is performed at a pressure of 5 to 60 bar and at a temperature of 50 to 80° C.

7. The method according to claim 1, wherein the 1-alkene is ethylene, and the metal oxide is aluminum oxide, respectively, and the polymerization reaction is performed at a pressure of 5 to 60 bar and at a temperature of 50 to 80° C.

8. The method according to claim 1, wherein the amount of the acrylate based monomer is in the range of 30 to 99 mol % based on the total amount of the mixture of monomer.

9. The method according to claim 1, wherein the amount of the acrylate based monomer is in the range of 50 to 99 mol % based on the total amount of the mixture of monomer.

10. The method according to claim 1, wherein 50 mol % of the 1-alkene reacts with 50 mol % of the acrylate based monomer such that an alternative copolymer in the -A-B-A-B- form may be produced.

11. The method according to claim 1, wherein the metal oxide is selected from the group of metal oxides of $Al_2O_3$, $Y_2O_3$, $ZrO_2$, $HfO_2$, $SiO_2$, $B_2O_3$, $CeO_2$, $Dy_2O_3$, $Er_2O_3$, $Eu_2O_3$, $Gd_2O_3$, $Ho_2O_3$, $La_2O_3$, $Lu_2O_3$, $Nd_2O_3$, $Pr_6O_{11}$, $Sm_2O_3$, $Tb_2O_3$, $Th_4O_7$, $Tm_2O_3$, $Yb_2O_3$, SnO and $TiO_2$; and complex metallic oxides of $Dy_3Al_5O_{12}$, $Y_3Al_5O_{12}$, $Al_2O_3.TiO_2$, $3Al_2O_3.SiO_2$, $CaTiO_3$, $CaZrO_3$, $FeTiO_3$, $MgO.Al2O_3$, $CeAl_{11}O_{18}$, $Al_2(SO_4)_3$, and $AlPO_4$.

12. The method according to claim 1, wherein the metal oxide is separated and refined after the polymerization reaction and then reused in a new polymerization reaction.

13. The method according to claim 1, wherein the amount of the metal oxide is in the range of 0.01 to 200 mol % based on the amount of the acrylate based monomer.

14. The method according to claim 1, wherein the Lewis acid is selected from the group consisting of aluminum trichloride, scandium triflate, zinc triflate, copper triflate, trifluorboron, and mixtures thereof.

15. The method according to claim 1, wherein the amount of the Lewis acid is in the range of 0.01 to 1 mol based on 1 mol of the acrylate based monomer.

16. The method according to claim 1, wherein the radical polymerization initiator is a compound selected from the group consisting of peroxide, azo compound and mixtures thereof.

17. The method according to claim 1, wherein the amount of the radical polymerization initiator is in the range of 0.001 to 1 mol % based on the amount of the acrylate based monomer.

18. The method according to claim 1, wherein the radical polymerization initiator is AIBN.

19. The method according to claim 1, wherein the polymerization reaction is performed under presence of at least one solvent selected from the group consisting of toluene, chlorobenzene, n-hexane, tetrahydrofuran, chloroform, ether, methanol, ethanol and methylenechloride.

20. The method according to claim 1, wherein the glass transition temperature (Tg) of the copolymer is in the range of 0 to 200° C.

21. The method according to claim 1, wherein the number average molecular weight of the copolymer is in the range of 5,000 to 200,000 g/mol and the weight average molecular weight of the copolymer is in the range of 10,000 to 500,000 g/mol.

22. The method according to claim 1, wherein Td_50 of the copolymer is in the range of 350 to 550° C.

23. The method according to claim 1, wherein the 1-alkene is selected from the group consisting of ethylene, propylene, 1-butene, 1-pentene, 1-hexene, 1-heptene, 1-octene, 1-nonene, and 1-decene.

24. A method for preparation of an alkene-acrylate based copolymer comprising a polymerization reaction of a mixture of monomer comprising alkene and an acrylate based monomer by a radical polymerization initiator under presence of a metal oxide represented in Formula 5, $M_xN_yO_z$            Formula 5 where M is at least one selected from the group consisting of an alkali earth metal, a transition metal, a group 13 and group 14 metal; N is a group 5 or group 6 group atom; 0 is an oxygen atom; x, y and z are a value determined by state of oxidation of M and N, and x>0, y≧0 and z>0.

25. The method according to claim 24, wherein the amount of the acrylate based monomer is in the range of 50 to 99 mol % based on the total amount of the mixture of monomer.

26. The method according to claim 24, wherein the alkene having the mole ratio of 4.5 to 5.5 reacts with the acrylate based monomer having the mole ratio of 5.5 to 4.5.

27. The method according to claim 24, wherein the metal oxide is selected from the group consisting of a metal oxide of $Al_2O_3$, $Y_2O_3$, $ZrO_2$, $HfO_2$, $SiO_2$, $B_2O_3$, $CeO_2$, $Dy_2O_3$, $Er_2O_3$, $Eu_2O_3$, $Gd_2O_3$, $Ho_2O_3$, $La_2O_3$, $Lu_2O_3$, $Nd_2O_3$, $Pr_6O_{11}$, $Sm_2O_3$, $Tb_2O_3$, $Th_4O_7$, $Tm_2O_3$, $Yb_2O_3$, SnO and $TiO_2$; and a complex metal oxide of $Dy_3Al_5O_{12}$, $Y_3Al_5O_{12}$, $Al_2O_3.TiO_2$, $3Al_2O_3.SiO_2$, $CaTiO_3$, $CaZrO_3$, $FeTiO_3$, $MgO.Al2O_3$, $CeAl_{11}O_{18}$, $Al_2(SO_4)_3$, and $AlPO_4$.

28. The method according to claim 24, wherein the alkene is selected from the group consisting of norbornene, norbornene derivatives, and a mixture thereof, and the norbornene and norbornene derivatives are a compound as represented in Formula 4,

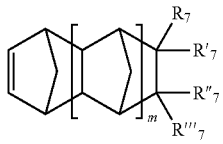

Formula 4 where m is a positive number of 0 to 4, $R_7$, $R'_7$, $R''_7$ and $R'''_7$ are a polar functional group or a nonpolar functional group, respectively and independently, $R_7$, $R_7'$, $R_7''$ and $R_7'''$ can form a C4-C12 saturated or unsaturated cyclic group, or a C6-C24 aromatic ring, where the nonpolar functional group is hydrogen; halogen; a linear or branched C1-C20 alkyl or haloalkyl; a linear or branched C2-C20 alkenyl or haloalkenyl; a linear or branched C2-C20 alkynyl or haloalkynyl; a linear or branched C1-C20 alkyl or haloalkyl, a linear or branched C2-C20 alkenyl or haloalkenyl, a linear or branched C2-C20 alkynyl or haloalkynyl, or halogen-substituted or unsubstituted C3-C12 cycloalkyl; a linear or branched C1-C20 alkyl or haloalkyl, a linear or branched C2-C20 alkenyl or haloalkenyl, a linear or branched C2-C20 alkynyl or haloalkynyl, or halogen-substituted or unsubstituted C6-C40 aryl; or a linear or branched C1-C20 alkyl or haloalkyl; a linear or branched C2-C20 alkenyl or haloalkenyl; a linear or branched C2-C20 alkynyl or haloalkynyl, or halogen-substituted or unsubstituted C7-C15 aralkyl, where the polar functional group is non-hydrocarbonaceous polar group including at least one oxygen, nitrogen, phosphorus, sulfur, or boron, including, —$R^8OR^9$, —$OR^9$, —$OC(O)OR^9$, —$R^8OC(O)OR^9$, —$C(O)R^9$, —$R^8C(O)R^9$, —$OC(O)R^9$, —$R^8C(O)OR^9$, —$C(O)OR^9$, —$R^8OC(O)R^9$, —$(R^8O)_k$—$R^9$, —$(R^8O)_k$—$OR^9$, —$C(O)$—$O$—$C(O)R^9$, —$R^8C(O)$—$O$—$C(O)R^9$, —$SR^9$, —$R^8SR^9$, —$SSR^9$, —$R^8SSR^9$, —$S(=O)R^9$, —$R^8S(=O)R^9$, —$R^8C(=S)R^9$, —$R^8C(=S)SR^9$, —$R^8SO_3R^9$, —$SO_3R^9$, —$R^8N=C=S$, —$NCO$, —$R^8$—$NCO$, —$CN$, —$R^8CN$, —$NNC(=S)R^9$, —$R^8NNC(=S)R^9$, —$NO_2$, —$R^8NO_2$,

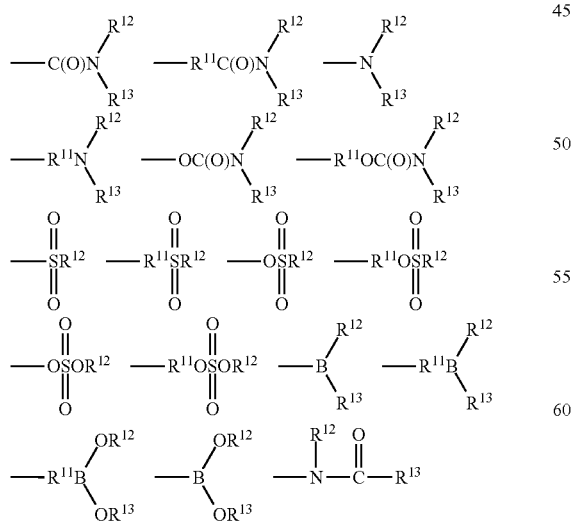

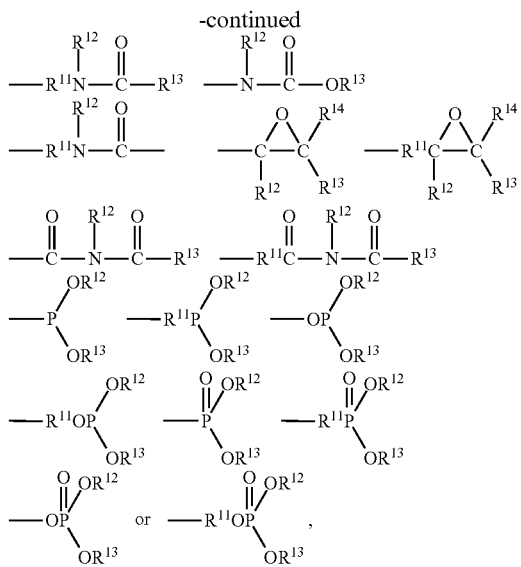

wherein the polar functional group, $R^8$ and $R^{11}$ are, respectively and independently, hydrogen; halogen; a linear or branched C1-C20 alkylene or haloalkylene; a linear or branched C2-C20 alkenylene or haloalkenylene; a linear or branched C2-C20 alkynylene or haloalkynylene; a linear or branched C1-C20 alkyl or haloalkyl, a linear or branched C2-C20 alkenyl or haloalkenyl, a linear or branched C2-C20 alkynyl or haloalkynyl, or halogen-substituted or unsubstituted C3-C12 cycloalkylene; a linear or branched C1-C20 alkyl or haloalkyl; a linear or branched C2-C20 alkenyl or haloalkenyl; a linear or branched C2-C20 alkynyl or haloalkynyl, or halogen-substituted or unsubstituted C6-C40 arylene; or a linear or branched C1-C20 alkyl or haloalkyl, a linear or branched C2-20 alkenyl or haloalkenyl; a linear or branched C2-20 alkynyl or haloalkynyl, or halogen-substituted or unsubstituted C7-C15 aralkylene, where $R^9$, $R^{12}$ and $R^{13}$ are, respectively and independently, hydrogen; halogen; a linear or branched C1-C20 alkyl or haloalkyl; a linear or branched C2-C20 alkenyl or haloalkenyl; a linear or branched C2-C20 alkynyl or haloalkynyl; a linear or branched C1-C20 alkyl or haloalkyl; a linear or branched C2-C20 alkenyl or haloalkenyl; a linear or branched C2-C20 alkynyl or haloalkynyl, or halogen-substituted or unsubstituted C3-C12 cycloalkyl; a linear or branched C1-C20 alkyl or haloalkyl; a linear or branched C2-C20 alkenyl or haloalkenyl; a linear or branched C2-C20 alkynyl or haloalkynyl, or halogen-substituted or not C6-C40 aryl; or a linear or branched C1-C20 alkyl or haloalkyl; a linear or branched C2-C20 alkenyl or haloalkenyl; a linear or branched C2-C20 alkynyl or haloalkynyl, or halogen-substituted or unsubstituted C7-C15 aralkyl; a linear or branched C1-C20 alkoxy, or haloalkoxy; carbonyloxy or halocarbonyloxy, and where each of k is a positive number of 1 to 10.

* * * * *

UNITED STATES PATENT AND TRADEMARK OFFICE
CERTIFICATE OF CORRECTION

PATENT NO.       : 7,884,161 B2
APPLICATION NO.  : 12/225174
DATED            : February 8, 2011
INVENTOR(S)      : Yoo-young Jung et al.

It is certified that error appears in the above-identified patent and that said Letters Patent is hereby corrected as shown below:

In The Claims:
Column 31, Claim 1, line 54, "an" should read --a--
Column 31, Claim 1, line 66, insert --the-- before "state"
Column 32, Claim 1, line 61, insert --to-- between "referred" and "as"
Column 33, Claim 1, line 1, delete "," at end of the line
Column 33, Claim 11, line 52, the formula "Al2O$_3$" should read --Al$_2$O$_3$--"
Column 34, Claim 24, line 45, insert --the-- between "by" and "state"
Column 34, Claim 27, line 60, the formula "Al2O$_3$" should read --Al$_2$O$_3$--
Column 35, Claim 28, line 32, insert --a-- between "is" and "non-hydrocarbon"

Column 36, Claim 28, line 7, " $\overset{R^{12}}{\underset{|}{R^{11}\!-\!N}}\!-\!\overset{O}{\underset{\|}{C}}\!-\!$ " should read -- $\overset{R^{12}}{\underset{|}{R^{11}\!-\!N}}\!-\!\overset{O}{\underset{\|}{C}}\!-\!OR^{13}$ --

Signed and Sealed this
Twenty-fourth Day of April, 2012

David J. Kappos
*Director of the United States Patent and Trademark Office*